US009613627B2

(12) United States Patent
Park et al.

(10) Patent No.: US 9,613,627 B2
(45) Date of Patent: Apr. 4, 2017

(54) MOBILE TERMINAL AND METHOD OF CONTROLLING THE MOBILE TERMINAL

(71) Applicant: LG ELECTRONICS INC., Seoul (KR)

(72) Inventors: Jiyoung Park, Seoul (KR); Jumin Chi, Seoul (KR); Sujin Kim, Seoul (KR); Sunghye Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 548 days.

(21) Appl. No.: 13/949,062

(22) Filed: Jul. 23, 2013

(65) Prior Publication Data

US 2014/0278408 A1 Sep. 18, 2014

(30) Foreign Application Priority Data

Mar. 15, 2013 (KR) .................. 10-2013-0028200

(51) Int. Cl.
| | |
|---|---|
| *G10L 15/26* | (2006.01) |
| *G10L 15/22* | (2006.01) |
| *G06F 3/0488* | (2013.01) |
| *H04M 1/725* | (2006.01) |
| *G10L 15/30* | (2013.01) |
| *G06F 3/0484* | (2013.01) |
| *G10L 21/10* | (2013.01) |

(52) U.S. Cl.
CPC ............ *G10L 15/26* (2013.01); *G06F 3/0488* (2013.01); *H04M 1/7255* (2013.01); *G06F 3/04847* (2013.01); *G10L 15/22* (2013.01); *G10L 15/30* (2013.01); *G10L 21/10* (2013.01)

(58) Field of Classification Search
CPC ......... G10L 15/26; G10L 15/22; G10L 15/00; G10L 15/30
See application file for complete search history.

(56) References Cited

U.S. PATENT DOCUMENTS

| | | | |
|---|---|---|---|
| 6,802,041 B1 * | 10/2004 | Rehm ............... | G06F 17/30017 707/E17.009 |
| 9,087,508 B1 * | 7/2015 | Dzik ..................... | G10L 21/057 |
| 2008/0055264 A1 * | 3/2008 | Anzures ............. | G06F 3/04883 345/173 |
| 2008/0180394 A1 * | 7/2008 | Yun ...................... | G06F 3/0481 345/157 |

(Continued)

FOREIGN PATENT DOCUMENTS

| | | |
|---|---|---|
| EP | 2114058 A2 | 11/2009 |
| WO | WO 2008/127322 A1 | 10/2008 |

*Primary Examiner* — Samuel G Neway
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a memory configured to store recorded voice data; a display unit configured to display a graphic object representing a reproduction progress of the recorded voice data; and a controller configured to receive a selection signal indicating a portion of the graphic object has been selected, select a section of the recorded voice data including a point-in-time at which the graphic object is selected, convert keyword voice data included in the selected section of the recorded voice data to keyword text data, and display the keyword text data on the display unit.

12 Claims, 28 Drawing Sheets

(56) References Cited

U.S. PATENT DOCUMENTS

| | | | |
|---|---|---|---|
| 2009/0275365 A1* | 11/2009 | Lee | H04M 1/271 |
| | | | 455/563 |
| 2010/0107117 A1* | 4/2010 | Pearce | G11B 27/322 |
| | | | 715/790 |
| 2012/0245936 A1* | 9/2012 | Treglia | G06F 17/30746 |
| | | | 704/235 |
| 2013/0290892 A1* | 10/2013 | Basapur | G06F 17/30064 |
| | | | 715/772 |
| 2013/0297308 A1* | 11/2013 | Koo | G06F 3/167 |
| | | | 704/235 |
| 2014/0051399 A1* | 2/2014 | Walker | H04L 65/1083 |
| | | | 455/412.1 |
| 2014/0278408 A1* | 9/2014 | Park | G06F 3/0488 |
| | | | 704/235 |
| 2014/0317245 A1* | 10/2014 | Lou | H04L 65/4084 |
| | | | 709/219 |

* cited by examiner

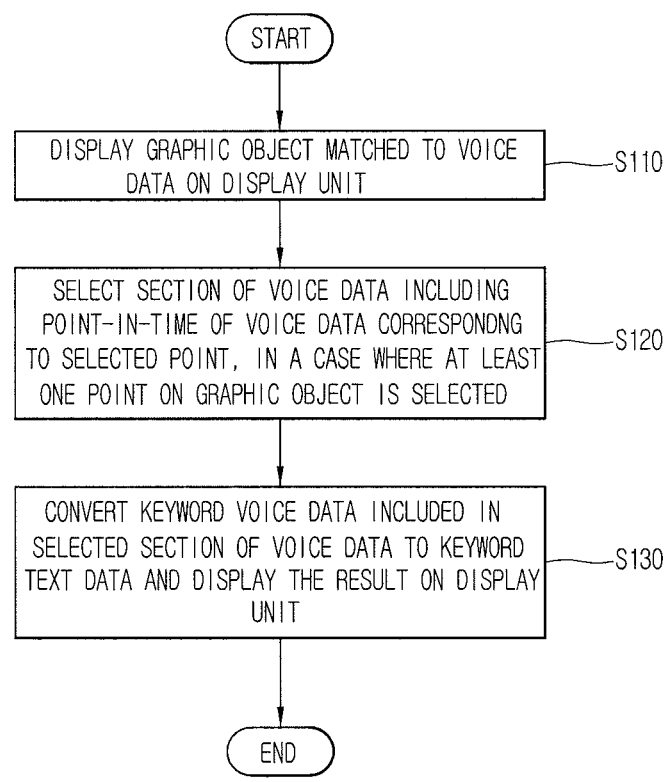

FIG. 23
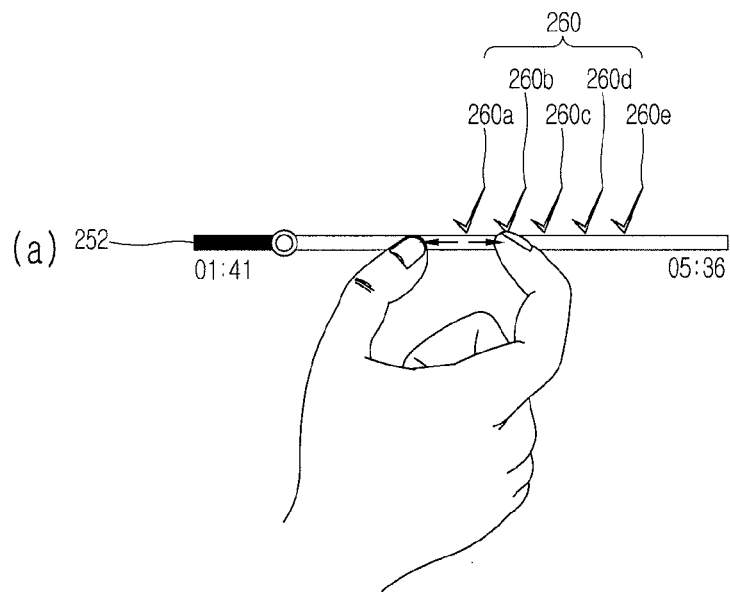
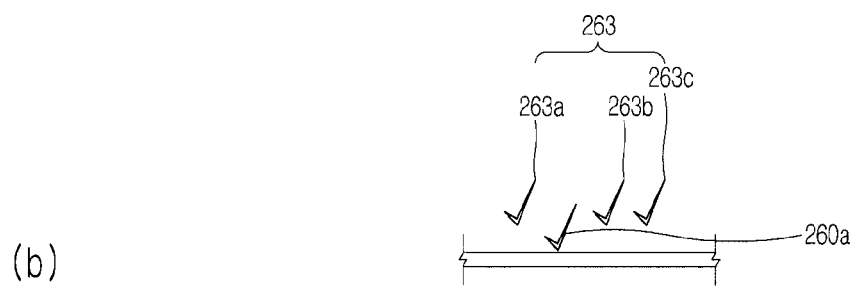

FIG. 26
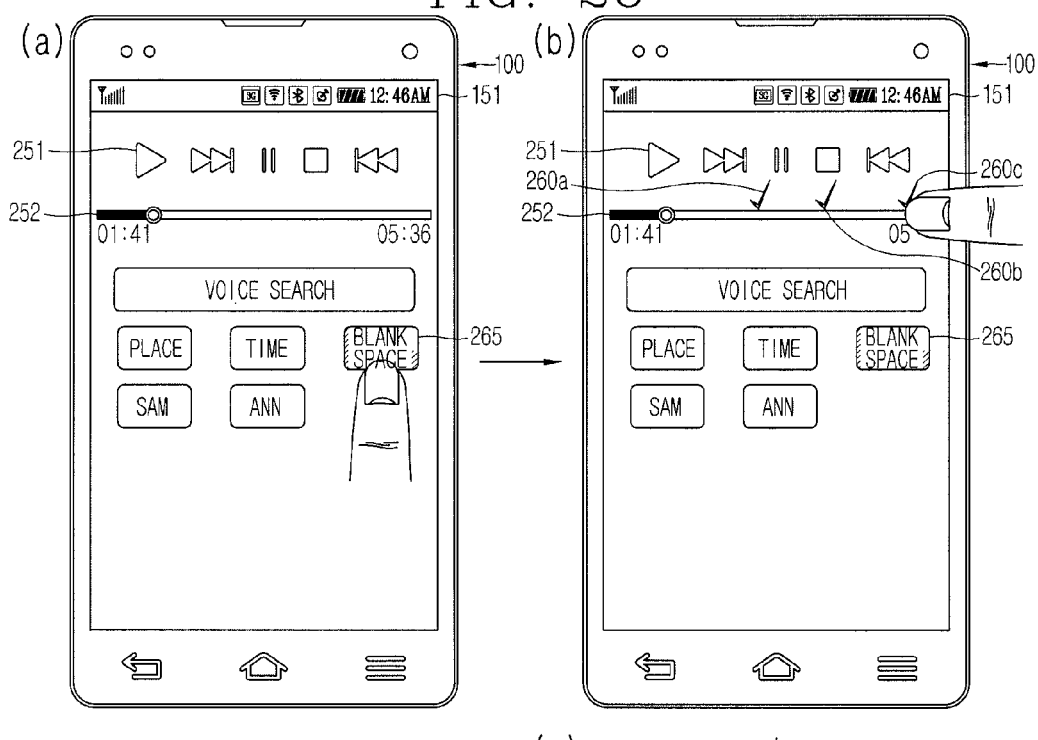
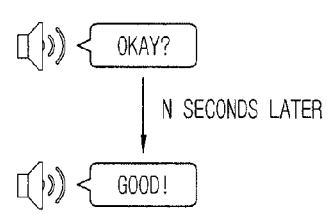

MOBILE TERMINAL AND METHOD OF CONTROLLING THE MOBILE TERMINAL

CROSS-REFERENCE TO RELATED APPLICATION

Pursuant to 35 U.S.C. §119(a), this application claims the benefit of earlier filing date and right of priority to Korean Application No 10-2013-0028200, filed on Mar. 15, 2013, the contents of which is incorporated by reference herein in its entirety.

BACKGROUND OF THE INVENTION

Field of the Disclosure

The present invention relates to a mobile terminal and more particularly to a mobile terminal for outputting voice data and a method of controlling the mobile terminal.

Background of the Invention

In general, a terminal may be classified into a mobile (portable) terminal and a stationary terminal. The mobile terminal may be also classified into a handheld terminal and a vehicle mount terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. A mobile terminal can also output voice data while displaying a progress bar showing a reproduction progress state of the voice data. However, a currently-available progress bar shows only the reproduction progress state of currently output voice data.

SUMMARY OF THE INVENTION

Therefore, an aspect of the detailed description is to provide a mobile terminal for providing a user with an improved convenience of displaying the progress bar showing the reproduction progress state of voice data and a method of controlling the mobile terminal.

To achieve these and other advantages and in accordance with the purpose of this specification, as embodied and broadly described herein, there is provided a mobile terminal including a display unit that displays a graphic object matched to voice data, and a controller that, when at least one point on the graphic object is selected, selects a section of the voice data including a point-in-time at which the voice data corresponds to the selected point, wherein the controller converts a keyword voice data included in the selected section of the voice data to a keyword text data, thereby displaying the resulting keyword text data on the display unit.

In the mobile terminal, the controller may extract at least one of the items of keyword voice data included in the selected section of the voice data, and may convert the extracted keyword voice data to the keyword text data, thereby displaying the resulting keyword text data on the display unit.

In the mobile terminal, the graphic object may include a progress bar showing a reproduction progress state of the voice data, and the controller may display a first object showing the selected point on the progress bar.

In the mobile terminal, the controller may detect the extent to which a touch is applied to the selected point, and may determine at least one of a length of the section of the voice data and an amount of the keyword voice data to be extracted, based on the extent to which the touch is applied.

In the mobile terminal, the controller may detect at least one of a change and a duration in a touch operation from starting of the touch input to the graphic object and to releasing of the touch input from the graphic object, and thus may determine the extent to which the touch is applied.

In the mobile terminal, the controller may display an icon showing the extent to which the touch is applied, on the display unit.

In the mobile terminal, the controller may determine at least one of order in which to display the keyword text data corresponding to the extracted keyword voice data and a method of displaying the keyword text data corresponding to the extracted keyword voice data, based on a result of comparing the point-in-time at which the voice data corresponds to the selected point and a point-in-point at which the extracted keyword voice data is output.

In the mobile terminal, the controller may determine at least one of order in which to display the keyword text data corresponding to the extracted keyword voice data and a method of displaying the keyword text data corresponding to the extracted keyword voice data, based on the number of times that the extracted keyword voice data included in the selected section is output.

In the mobile terminal, when at least one of the items of keyword text data is selected, the controller may detect a point-in-time at which the keyword voice data corresponds to the selected keyword text data is output, may select a first section of the voice data including the detected point-in-time at which the keyword voice data is output, and may convert first voice data included in the selected first section to first text data, thereby displaying the resulting first text data.

In the mobile terminal, when at least one part of the first text data is selected, the controller may display a second object showing a point-in-time at which the at least one part selected is output, on the progress bar.

In the mobile terminal, the controller may divide the progress bar into multiple regions, based on a display position of the second object on the progress bar, and may divide a file of the voice data into the multiples files in such a manner that the multiple files correspond to the regions that result from the division, respectively.

In the mobile terminal, when at least one of the regions that result from the division is selected, the controller may enlarge the selected region, and display the result on the display unit, and may display an icon corresponding to a function of reproducing the file of the voice data that results from the division, corresponding to the selected region, along with the selected region.

In the mobile terminal, when the predetermined touch input is detected on at least one of the regions that result from the division, the controller may edit the file of the voice data that results from the division, corresponding to the touched-on region.

In the mobile terminal, when the touch input is detected on the display unit, the controller may select a second section from the items of voice data, based on information on a property of the detected touch input, and may convert second voice data included in the second section to second text data, thereby displaying the resulting second text data on the display unit.

In the mobile terminal, the second section of the voice data may be a section of the voice data, which includes the keyword voice data corresponding to the selected keyword text data and which is different from the first section.

In the mobile terminal, the controller may again extract the keyword voice data from the second section of the voice data and may convert the again-extracted keyword voice data to the keyword text data, thereby displaying the resulting keyword text data on the display unit.

The mobile terminal may further include a user input unit that is formed in such a manner to receive an input of keyword data including at least one of the keyword voice data and the keyword text data, and in the mobile terminal, when the keyword data is input to the controller, the controller may extract a point-in-time at which the keyword data is output from the voice data and may display a third object on a point on the progress bar, corresponding to the extracted point-in-time.

In the mobile terminal, the controller may analyze the voice data and display at least one menu item, based on a result of the analysis, and, when the menu item is selected, may extract the keyword voice data associated with the selected menu item from the items of voice data, and may convert the extracted keyword voice data to the keyword text data, thereby displaying the resulting keyword text data.

To achieve these and other advantages and in accordance with the purpose of this specification, as embodied and broadly described herein, there is provided a method of controlling a mobile terminal, including displaying a graphic object matched to voice data on a display unit, selecting a section of the voice data including a point in-time of the voice data corresponding to a selected point when at least one point on the graphic object is selected; and converting a keyword voice data included in the selected section of the voice data to a keyword text data, thereby displaying the resulting keyword text data on the display unit.

In the method of controlling a mobile terminal, the converting of the keyword voice data included in the selected section of the voice data to the keyword text data includes extracting at least one of the items of voice data included in the selected section of the voice data, and converting the extracted keyword voice data to the keyword text data and displaying the resulting keyword text data on the display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 4 is a flowchart illustrating a mobile terminal according to an embodiment of the present invention;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. The suffixes attached to components of the wireless speaker, such as 'module' and 'unit or portion' were used for facilitation of the detailed description of the present invention. Therefore, the suffixes do not have different meanings from each other.

The mobile terminal according to an embodiment of the present invention may include a portable phone, a smart phone, a laptop computer, a tablet computer, a digital broadcasting terminal, Personal Digital Assistants (PDA), Portable Multimedia Player (PMP), a navigation system, a slate PC, a tablet PC, an ultrabook, etc. The present invention discloses a mobile terminal, but it would be easily understood by those skilled in the art that the configuration according to the embodiment disclosed herein may be applicable to a stationary terminal, such as a digital TV, a desktop computer, and the like, excluding a case where it is applicable to only the mobile terminal.

Figure 1:
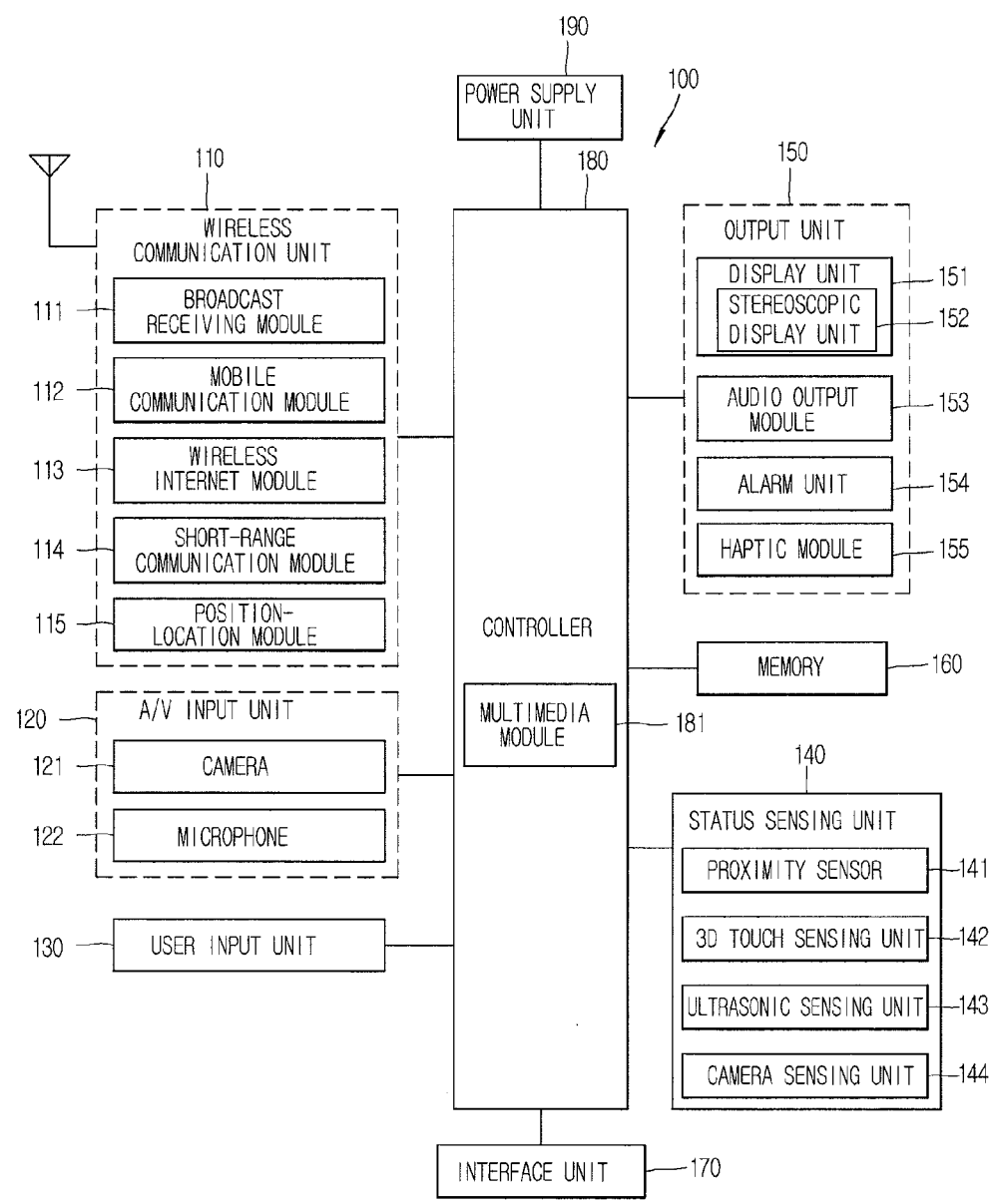
FIG. 1 is a block diagram illustrating a mobile terminal according to one embodiment of the present invention.

FIG. 1 is a block diagram of a mobile terminal 100 according to one embodiment of the present invention. As shown in FIG. 1, the mobile terminal 100 includes a wireless communication unit 110, an Audio/Video (A/V) input unit

120, a user input unit 130, a sensing unit 140, an output unit 150, a memory 160, an interface unit 170, a controller 180, a power supply unit 190, and the like. FIG. 1 shows the mobile terminal 100 having various components, but greater or fewer components may alternatively be implemented.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc.

The broadcast receiving module 111 may be configured to be suitable for every broadcast system that provides a broadcast signal as well as the above-mentioned digital broadcast systems. Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

Furthermore, the display unit 151 may be configured with a stereoscopic display unit 152 for displaying a stereoscopic image. Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit. The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, the proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include the proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound. For example, the ultrasound sensing unit 143 may be configured with an optical sensor and a plurality of ultrasound sensors. The optical sensor may be formed to sense light, and the ultrasound sensor may be formed to sense ultrasound waves. Because light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor. For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

In another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image. In addition, the controller 180 may implement a lock state for limiting the user's control command input to applications when the state of the mobile terminal satisfies a preset condition. Also, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

Figure 2A:
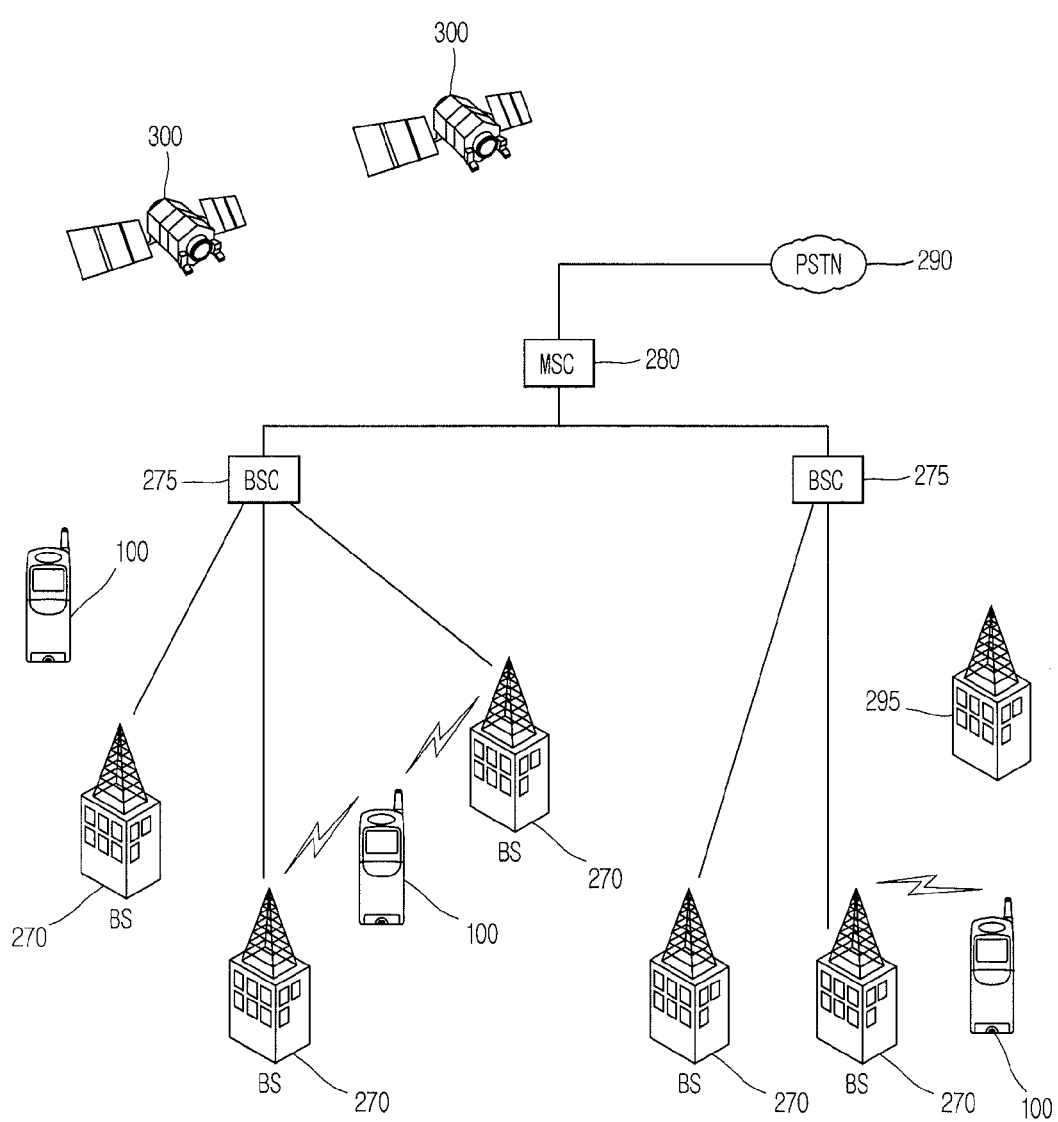
FIGS. 2A and 2B are views, each illustrating a conceptional framework of a telecommunication system in which the mobile terminal according to an embodiment of the present invention operates.
Figure 2B:
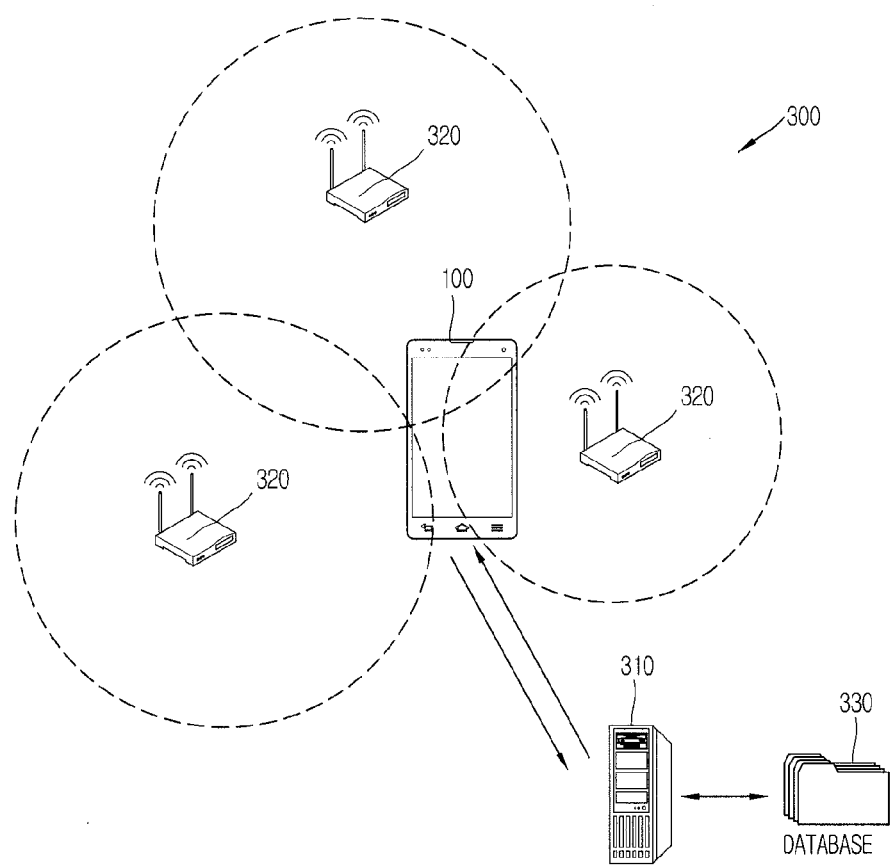

Next, a communication system that can be implemented through the mobile terminal 100 according to an embodiment of the present invention will be described. FIGS. 2A and 2B are conceptual views illustrating a communication system in which a mobile terminal 100 according to an embodiment of the present invention is operable.

FIGS. 2A and 2B are conceptual views of a communication system where the mobile terminal 100 according to the present invention can operate. First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B. The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present invention as illustrated in FIG. 1 or a mobile terminal disposed with the constituent elements of the mobile terminal or the structure of a mobile terminal will be described.

Figure 3A:
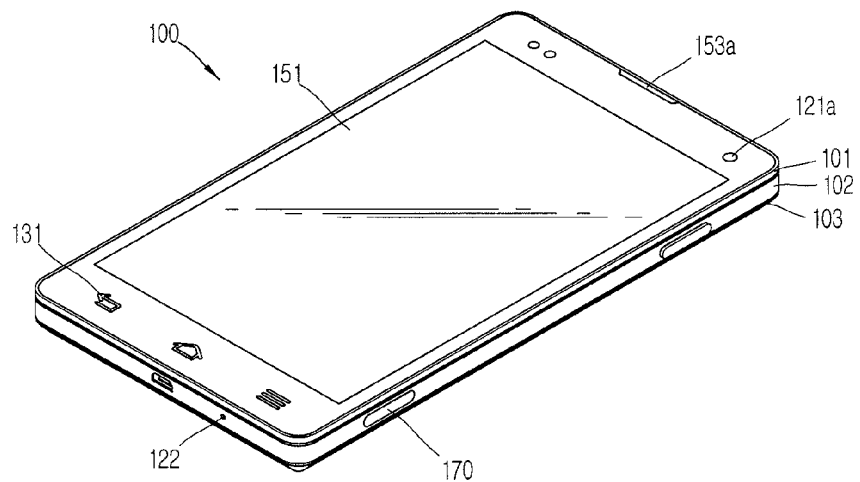
FIG. 3A is a front perspective view illustrating a mobile terminal according to an embodiment of the present invention.

FIG. 3A is a front perspective view illustrating an example of the mobile terminal 100 associated with an embodiment of the present invention. The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing mechanism to receive a control command by a touch method. When a touch is made to any one place on the display unit 151, the touch sensing mechanism may be configured to sense this touch and enter the content corresponding to the touched place. The content entered by a touch method may be a text or numerical value, or a menu item capable of indication or designation in various modes.

The touch sensing mechanism may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the drawing, the first manipulation unit 131 is a touch key, but the present invention is not limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
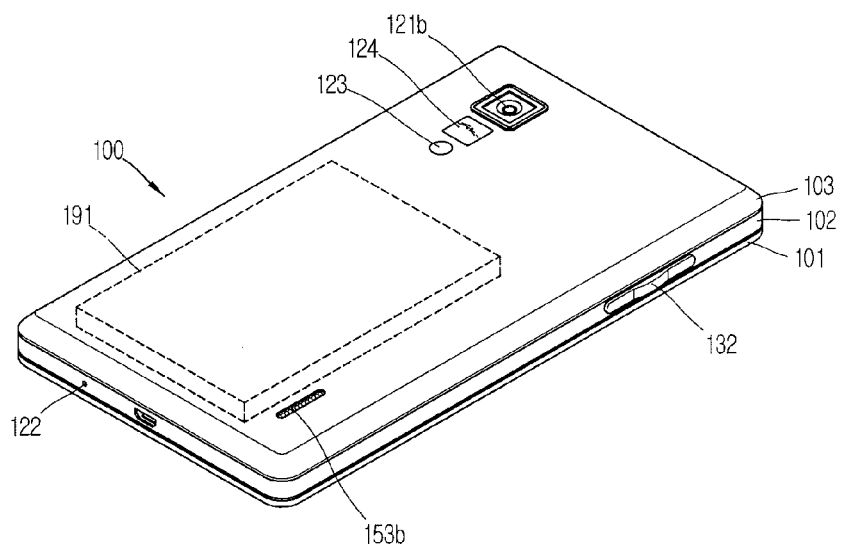
FIG. 3B is a rear perspective view illustrating the mobile terminal in FIG. 3A.

FIG. 3B is a rear perspective view illustrating mobile terminal 100 illustrated in FIG. 3A. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 may be provided in the terminal body in a retractable manner.

A power supply unit 190 for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

In addition, the mobile terminal 100 outputs voice data. Along with this function, the mobile terminal 100 displays a progress bar showing a reproduction progress state of voice data. However, a currently-available progress bar shows only the reproduction progress state of voice data that is being currently output, and it is not given any consideration in the practical use of voice data information corresponding to a given point on the progress bar.

As a solution to such a problem, the mobile terminal 100, capable of providing a user with an improved convenience of displaying the progress bar showing the reproduction progress state of voice data and a method of controlling the mobile terminal 100 are described below referring to the accompanying drawings.

FIG. 4 is a flowchart illustrating the mobile terminal 100 according to an embodiment of the present invention. The mobile terminal 100 includes the display unit 151 and the controller 180.

Referring to FIG. 4, first, the controller 180 displays a graphic object matched to the voice data on the display unit 151 (S110). Controlling the graphic object matched to the voice data is described below, but according to an embodiment of the present invention, it is possible to use not only the voice data, but also the graphic object that is matched to at least one of text data (for example, an electronic document, or an electronic book) and moving image data. In addition, the present invention is applied not only when outputting the voice data, but also when interrupting (for example, a pause) and stopping the output of the voice data.

The graphic object here includes a progress bar showing the reproduction progress state of the voice data. Also, the graphic object may include a bar showing at least one of a waveform and an amplitude of the voice data. The graphic object is matched to all the sections of the voice data.

Next, when at least one point on the graphic object is selected, the controller 180 selects a section of the voice data including a time-in-point in the voice data that corresponds to the selected point (S120). Further, the controller 180 receives a user input to cause at least one point on the graphic object to be selected. For example, the controller 180 selects at least one point on the graphic object, based on a touch input applied to the graphic object displayed on the display unit 151.

Also, the controller 180 receives the voice data from the user through a microphone 122, and selects at least one point on the graphic object, based on the received voice data. The controller 180 displays a first object showing the selected point on the graphic object. In addition, when the touch input is detected at least one point on the graphic object, the controller 180 detects the extent to which the touch is applied to the selected point.

Further, the controller 180 determines the extent to which the touch is applied, by detecting at least one of a change and a duration in a touch operation from starting of the touch input to the graphic object and to releasing of the touch input from the graphic object. Here, the extent to which the touch is applied is defined as a period of time for which the touch is maintained, the number of times that the touch is applied, or a distance that the touch is dragged, and when detecting a multi touch, it is defined as a value of a distance between first and second touch points.

In addition, the controller 180 may display an icon, which shows the extent to which the touch is applied, on the display unit 151. The icon showing the extent to which the touch is applied may be displayed separately from the graphic object that receives the touch input. Also, the extent to which the touch is applied to the graphic object may be directly displayed.

The icon may separately take on the shape of a progress bar for displaying the extent to which the touch is applied. However, the shape that the icon can take on is not limited to this. The icon may take on the shape of an instrument panel that indicates the extent to which the touch is applied, by an arrow. Also, the icon may show the extent to which the touch is applied, not only by using a numerical value, but also by using a change in color, or a change in size.

The controller 180 determines at least one of a length of the section of the voice data and an amount of keyword voice data to be extracted, based on the extent to which the touch is applied. According to one embodiment, the controller 180 determines the length of the section of the voice data, based on the extent to which the touch is applied. For example, when a drag input with a first length is applied to the selected point on the graphic object, the controller 180 selects a first section of the voice data including a point-in-time at which the voice data corresponds to the selected point.

In addition, when the drag input with a second length, greater than the first length, is applied to the selected point on the graphic object, the controller 180 selects a second section, longer than the first section. According to another embodiment, the controller 180 determines the amount of the keyword voice data to be extracted, based on the extent to which the touch is applied. For example, when the drag input with the first length is applied to the selected point on the graphic object, the controller 180 selects the first section of the voice data including the point-in-time at which the voice data corresponds to the selected point, and extracts the keyword voice data from within the first section.

In addition, when the drag input with the second length, greater than the first length, is applied to the selected point on the graphic object, the controller 180 extracts a greater amount of the keyword voice data from within the first section. Thereafter, the controller 180 converts the keyword voice data included in the selected section of the voice data to keyword text data and displays the result on the display unit 151 (S130).

According to one embodiment, the controller 180 extracts the keyword voice data from a voice data portion included in the selected section of the voice data. Because the voice data is in the form of a natural language, the controller 180 can extract the keyword voice data from the voice data portion included in the selected section, through the use of a natural language processing (NLP) algorithm.

In more detail, the natural language processing algorithm is an artificial intelligence technology that enables the mobile terminal 100 or a commuter to understand, generate, and analyze a human language. The task of understanding the natural language is a task of converting everyday language through a morph analysis, a semantic analysis and a dialog analysis for the purpose of enabling the mobile terminal 100 or the computer to process it.

The controller 180 converts the extracted keyword voice data to the keyword text data. A speak-to-text (SST) algorithm may be used to do this. The controller 180 displays the resulting keyword text data on one region adjacent to the graphic object.

According to another embodiment, the controller 180 converts the entire voice data portion included in the selected section of the voice data to the text data. Thereafter, the controller 180 selects the keyword text data from the resulting text data, and displays only the selected keyword text data on one region adjacent to the graphic object. That is, the STT algorithm is first used, and then the natural language processing algorithm is used.

As described above, according to an embodiment of the present invention, at least one part of the keyword data included in the section selected in the progress bar is extracted and the extracted keyword data is displayed in the form of text data on the display unit 151. Accordingly, the user can easily know which data is main keyword data at each point-in-time of the voice data.

Also, according to an embodiment of the present invention, an amount of the keyword data to be extracted is determined based on information on a property of the touch input to the progress bar. Accordingly, the user can intuitively identify what is the amount of the keyword data that he/she wants to know. As a result, the user convenience can be improved.

Figure 5:
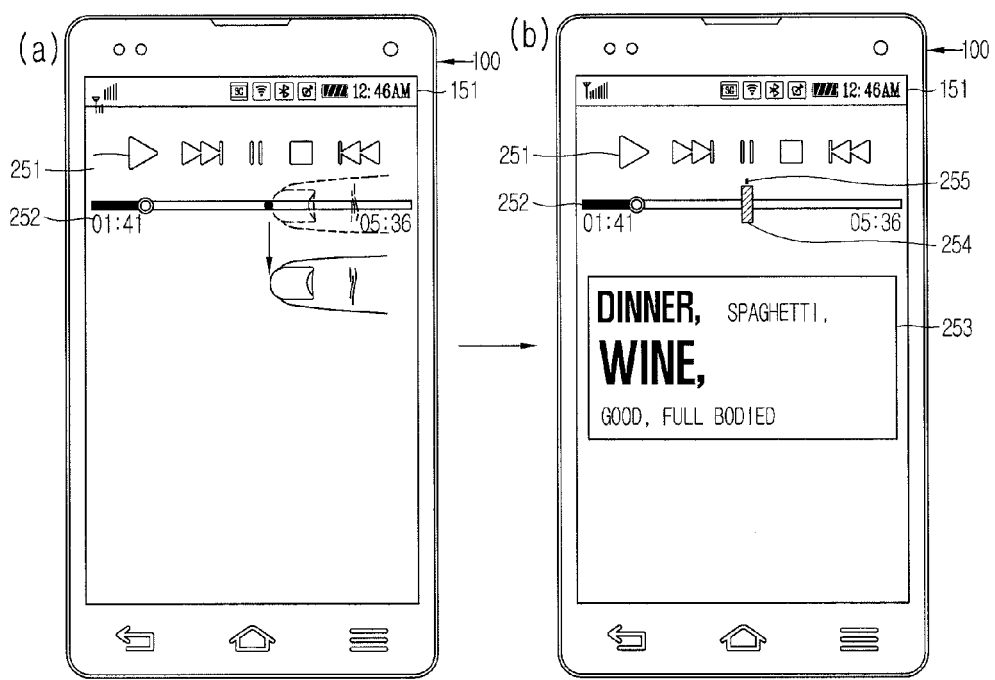
FIGS. 5(*a*) and 5(*b*) and FIGS. 6(*a*) and 6(*b*) are diagrams, each illustrating an operational example of the mobile terminal in FIG. 4.

Next, FIGS. 5(a) and 5(b) and FIGS. 6(a) and 6(b) are diagrams, each illustrating an operational example of the mobile terminal 100 in FIG. 4. Referring to FIG. 5(a), the display unit 151 displays buttons 251 associated with control of the voice data. For example, the buttons 251 includes a button corresponding to a function of reproducing the voice data, a button corresponding to a function of temporarily interrupting the reproducing of the voice data, and a button corresponding to a function of stopping the reproducing of the voice data.

Also, the display unit 151 displays a progress bar 252 as the graphic object that is matched to the voice data. The progress bar 252 is matched to all the sections of the voice data, and displays the reproduction progress state of the voice data.

At this time, one point on the progress bar 252 (hereinafter, referred to as a "first point) is selected, based on the touch input. When the first point is touched on and is dragged in a first direction (for example, in a downward direction), the controller 180 selects the section of the voice data (hereinafter, referred to as a "first section") including the point-in-time at which the voice data corresponds to the first point (hereinafter referred to as a "first point-in-time)

Referring to FIG. 5(b), the controller 180 displays an image (hereinafter referred to as a "first image") 254 showing the first section, on the progress bar 252. Along with this, the controller 180 displays a first object 255, which shows that the first point on the progress bar 252 is selected, on the first point or a region adjacent to the first point.

The controller 180 extracts the keyword voice data included in the first section of the voice data through the use of using the natural language processing algorithm. Thereafter, as illustrated in FIG. 5(b), the controller 180 converts the extracted keyword voice data to the keyword text data 253 and displays the resulting keyword text data 253 on the display unit 151.

In addition, as illustrated, the keyword text data 253 is displayed by using various display methods. For example, the controller 180 determines at least one of a font color, a font size, and a font thickness of each extracted keyword text data, based on the number of times that the keyword voice data extracted from the first section is output. Accordingly, as illustrated in FIG. 5(b), the keyword text data that is output the largest number of times (for example, "wine) can be displayed the largest.

In addition, the controller 180 determines at least one of the font color, the font size, and the font thickness of each extracted keyword text data, based on a result of comparing a first point-in-time at which the voice data corresponds to the first point and a point-in-time at which the extracted keyword voice data is output. That is, the controller 180 displays the keyword text data that is output to a point closest to the first point, most largely.

Figure 6:
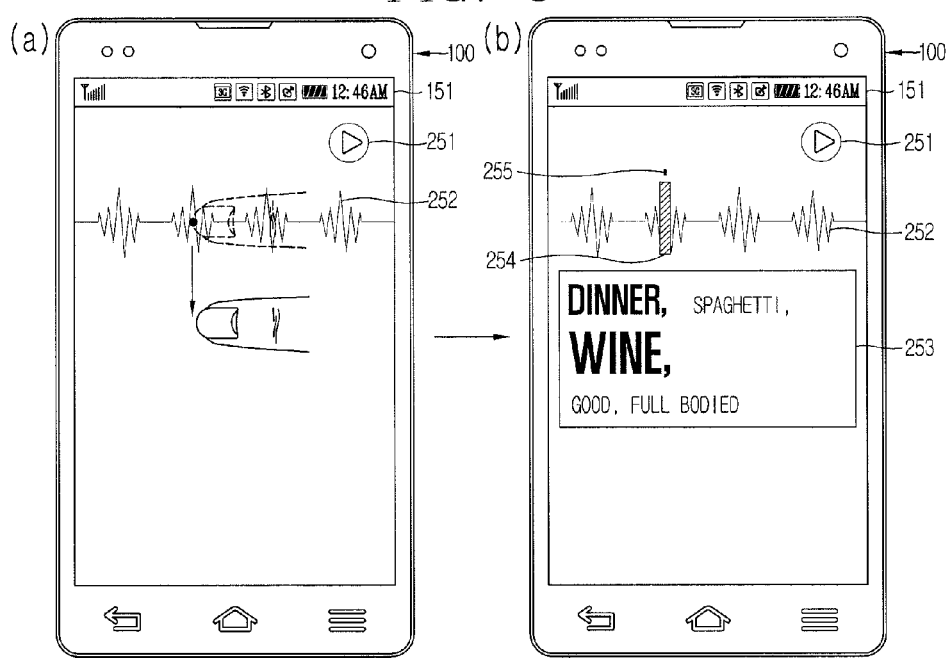

In addition, referring to FIG. 6(a), the display unit 151 displays the button 251 associated with the control of the voice data. For example, the button 251 corresponds to the function of reproducing the voice data. When the reproducing of the voice data is in progress, the button 251 corresponds to the function of stopping the reproducing of the voice data.

Also, the display unit 151 may include the bar 252 showing at least one of the waveform and the amplitude of the voice data, as the graphic object that is matched to the voice data. At this time, when the first point on the bar 252 is touched on and dragged in the first direction, the controller 180 selects the first section of the voice data including the first point-in-time at which the voice data corresponds to the first point.

Thereafter, as illustrated in FIG. 6(b), the controller 180 displays the keyword text data 253 included in the selected first section, on the display unit 151.

This is similar to FIG. 5(b).

Next, FIGS. 7(a) to 7(c), 8(a) to 8(c), and 9(a) to 9(c) are diagrams, each illustrating an operational example in which the keyword text data 253 is displayed differently depending on the extent to which the touch is applied to the progress bar 252. Referring to FIGS. 7(a) to 7(c) and 8(a) to 8(c), the controller 180 determines the length of the section depending on the extent to which the touch is applied to the progress bar 252.

Figure 7:
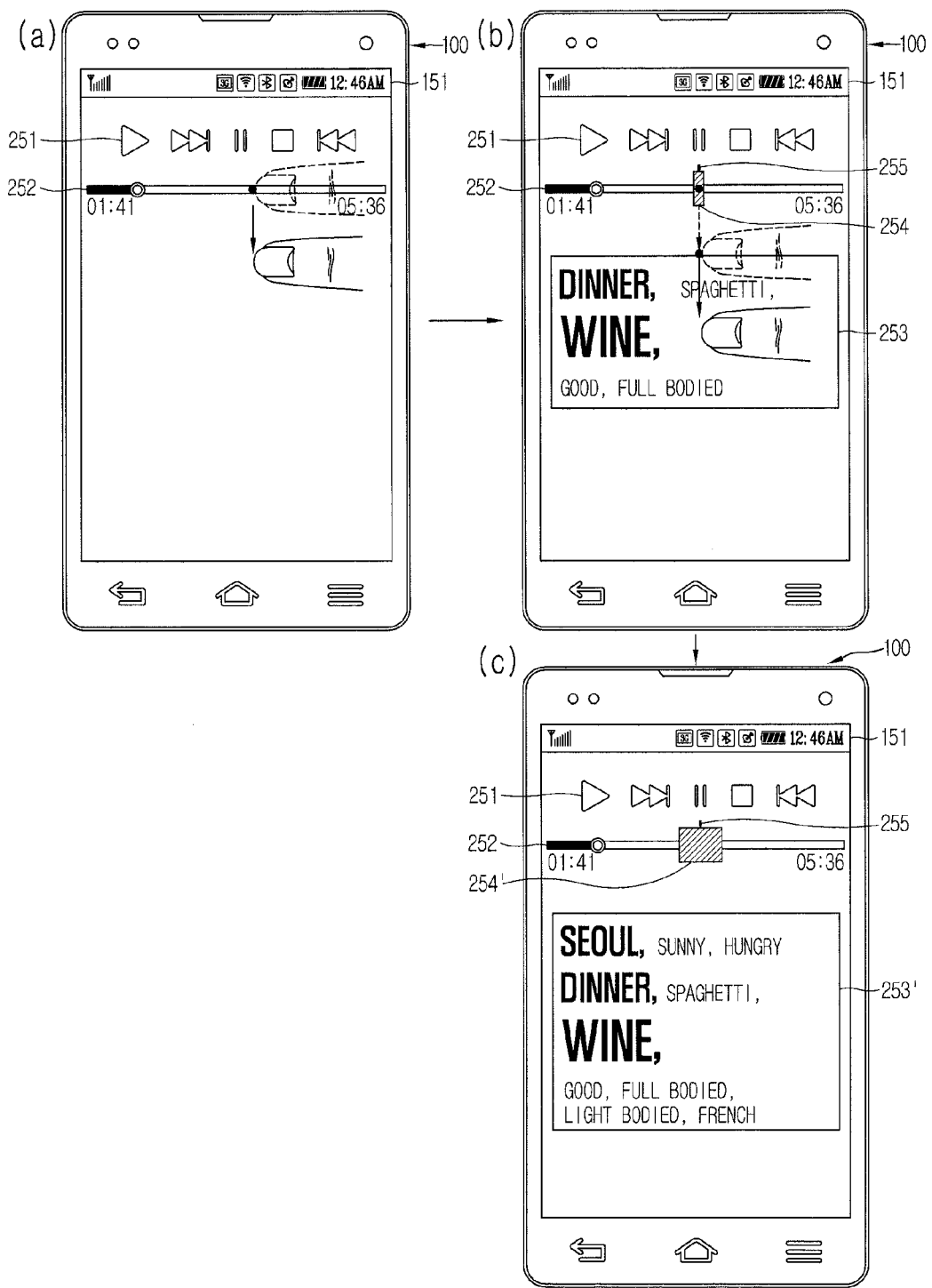
FIGS. 7(*a*) to 7(*c*), 8(*a*) to 8(*c*), and 9(*a*) to 9(*c*) are diagrams, each illustrating an operational example in which keyword text data is displayed differently depending on the extent to which a touch is applied to a progress bar.

Specifically, referring to FIG. 7(a), when the first point on the progress bar 252 displayed on the display unit 151 is dragged by a first distance, the controller 180 selects the first section of the voice data including the first point-in-time at which the voice data corresponds to the first point.

Accordingly, as illustrated in FIG. 7(b), the controller 180 displays the first image 254 showing the first section, on the progress bar 252. Also, the controller 180 displays the keyword text data 253 included in the first section, on the display unit 151. In addition, at this time, when the first point on the progress bar 252 is dragged by a second distance greater than the first distance, the controller 180 selects the second section, longer than the first section.

Accordingly, as illustrated in FIG. 7(c), the controller 180 displays a second image 254' showing the second section, on the progress bar 252. In addition, the second image 254' may be a separate image that is different from the first image 254, or an image that results from enlarging the first image in terms of a size.

Also, the controller 180 displays a keyword text data 253' included in the second section, on the display unit 151. The second section includes the first section, and thus an amount of the keyword text data 253' included in the second section is greater than an amount of the keyword text data 253 included in the first section.

In addition, according the embodiment, the first point on the progress bar 252 faces toward the first direction (for example, in the top to down direction) in the drawings, but when the first point on the progress bar 252 faces toward a second direction opposite to the first direction (for example, in the down to top direction), the controller 180 selects the second section shorter than the first section.

In addition, the controller 180 enlarges or reduces the image 254 in terms of a size, based on the touch input to the first image 254 displayed on the progress bar 252. Accordingly, the length of the selected first section is changed. Also, the controller 180 moves a position of the first image 254, based on the touch input to the first image 254, or the touch input to the progress bar 252, Accordingly, the selected first section is changed to a different section.

Figure 8:
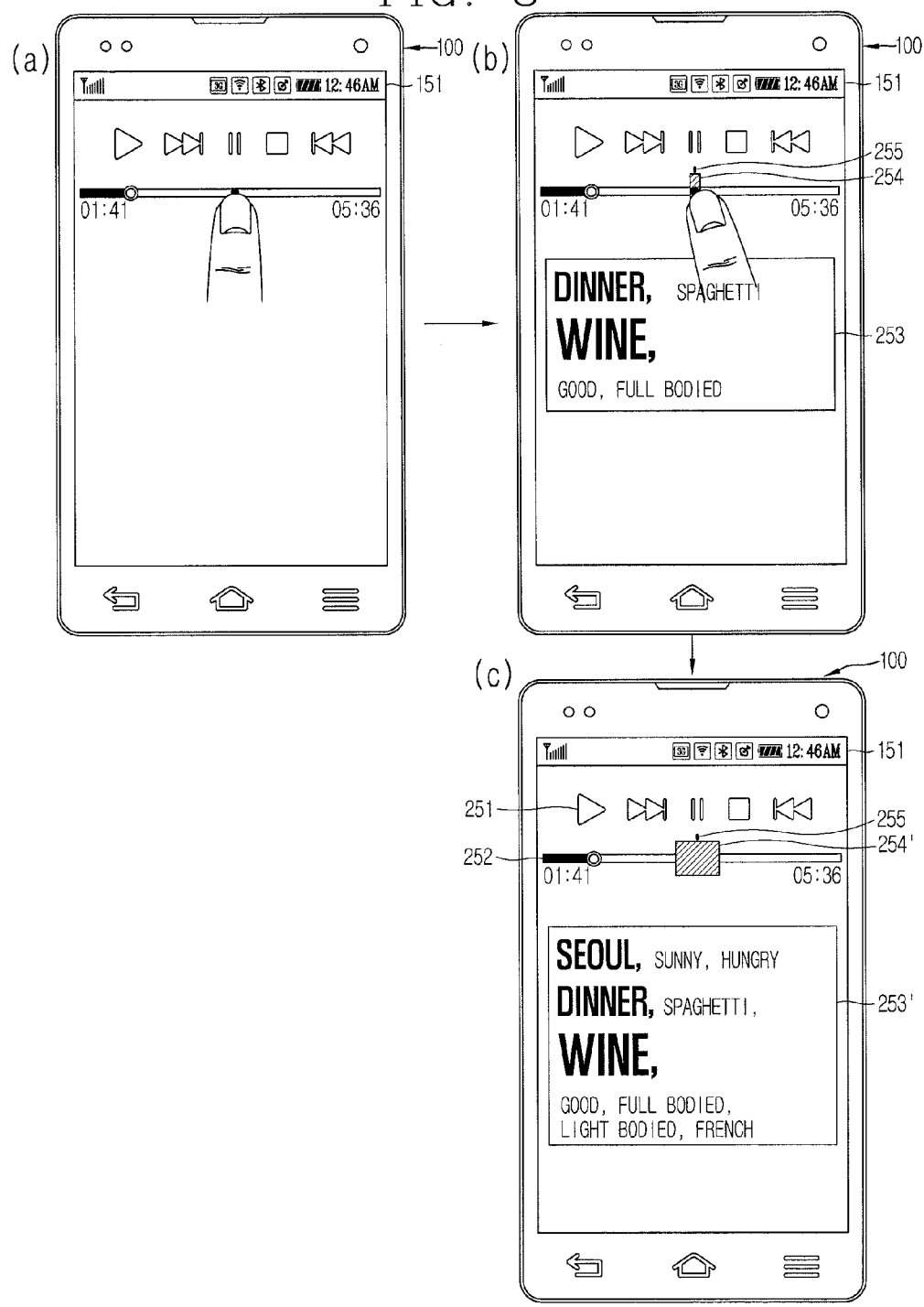

Referring to FIG. 8(a), when the first point on the progress bar 252 displayed on the display unit 151 is touched for one time period, the controller 180 selects the first section of the voice data including the first point-in-time at which the voice data corresponds to the first point. Accordingly, as illustrated in FIG. 8(b), the controller 180 displays the first image 254 showing the first section, on the progress bar 252. Also, the controller 180 displays the keyword text data 253 included in the first section, on the display unit 151.

In addition, at this time, when the first point on the progress bar 252 is dragged along the bar, the controller 180 selects the second section, longer than the first section. Accordingly, as illustrated in FIG. 8(c), the controller 180 displays the second image 254' showing the second section, on the progress bar 252. Also, the controller 180 displays the keyword text data 253' included in the second section, on the display unit 151.

The second section includes the first section, and thus the amount of the keyword text data 253' included in the second section is greater than the amount of the keyword text data 253 included in the first section. In another embodiment, in FIG. 8(b), the user can touch the first point for a second time period longer than the first time period to display the keyword text data 253' in FIG. 8(c).

Figure 9:
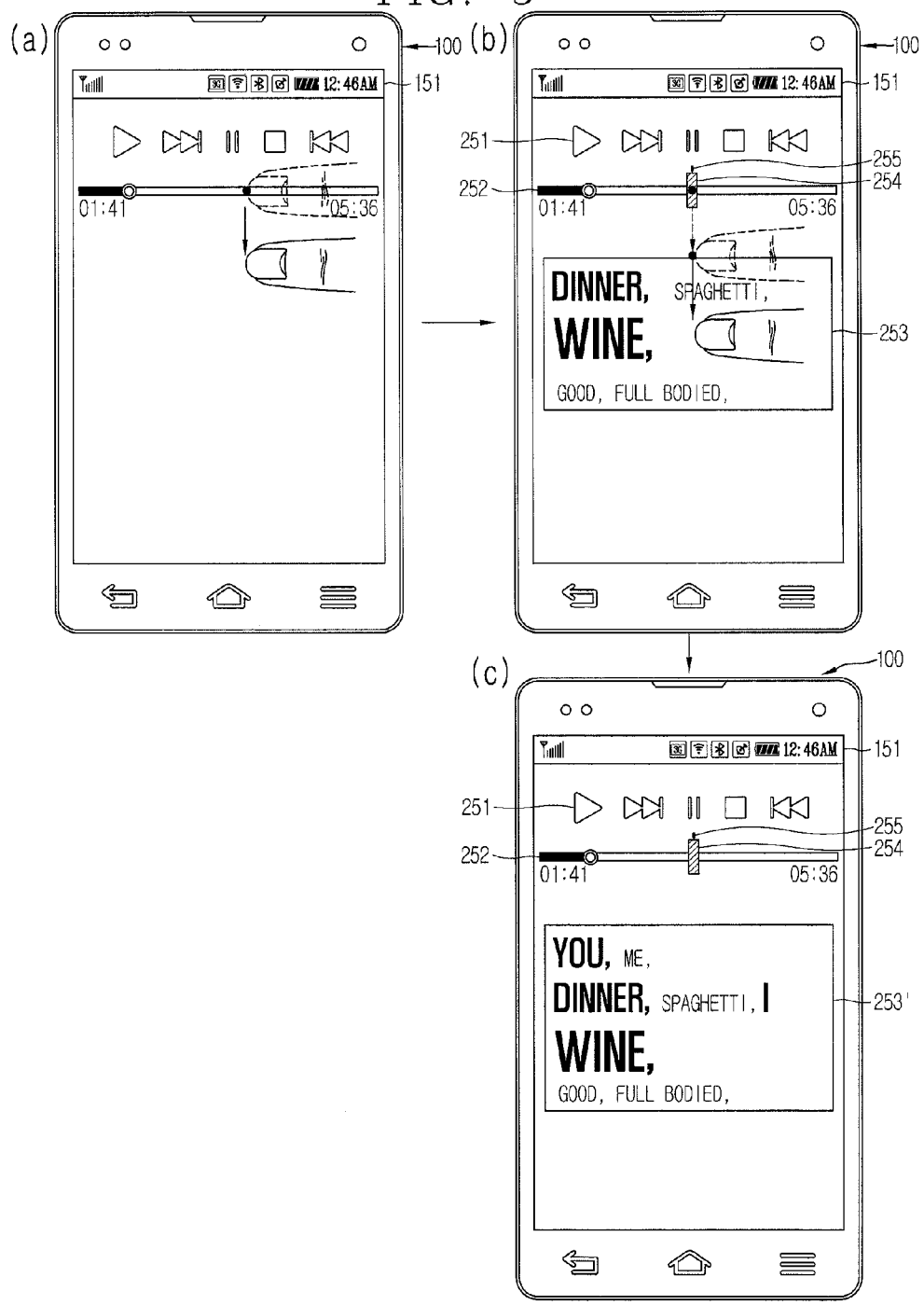

In addition, referring to FIGS. 9(a) to 9(c), the controller 180 determines the amount of the displayed keyword text data depending on the extent to which the touch is applied to the progress bar 252. Referring to FIGS. 9(a) and 9(b), when the first point on the progress bar 252 displayed on the display unit 151 is dragged by the first length, the controller 180 displays the keyword text data 253 included in the first section, on the display unit 151.

Thereafter, when the first point on the progress bar 252 is dragged by the second length longer than the first length, the controller 180 extracts a greater amount of the keyword voice data from within the first section. Accordingly, as illustrated FIG. 9(c), the greater amount of the keyword voice data is converted through the use of the STT algorithm and the keyword text data 253' is displayed on the display unit 151.

For example, the keyword text data 253 illustrated in FIG. 9(b) includes items of keyword text data (for example, "dinner, spaghetti, wine, good, and full bodied") that are determined as important keywords by the controller 180. However, the keyword text data 253' illustrated in FIG. 9(c) includes items of keyword text data that are determined as the important keywords, and less-important keywords (for example, "you, me, dinner, spaghetti, I, wine, good, and full bodied) by the controller 180.

Figure 10:
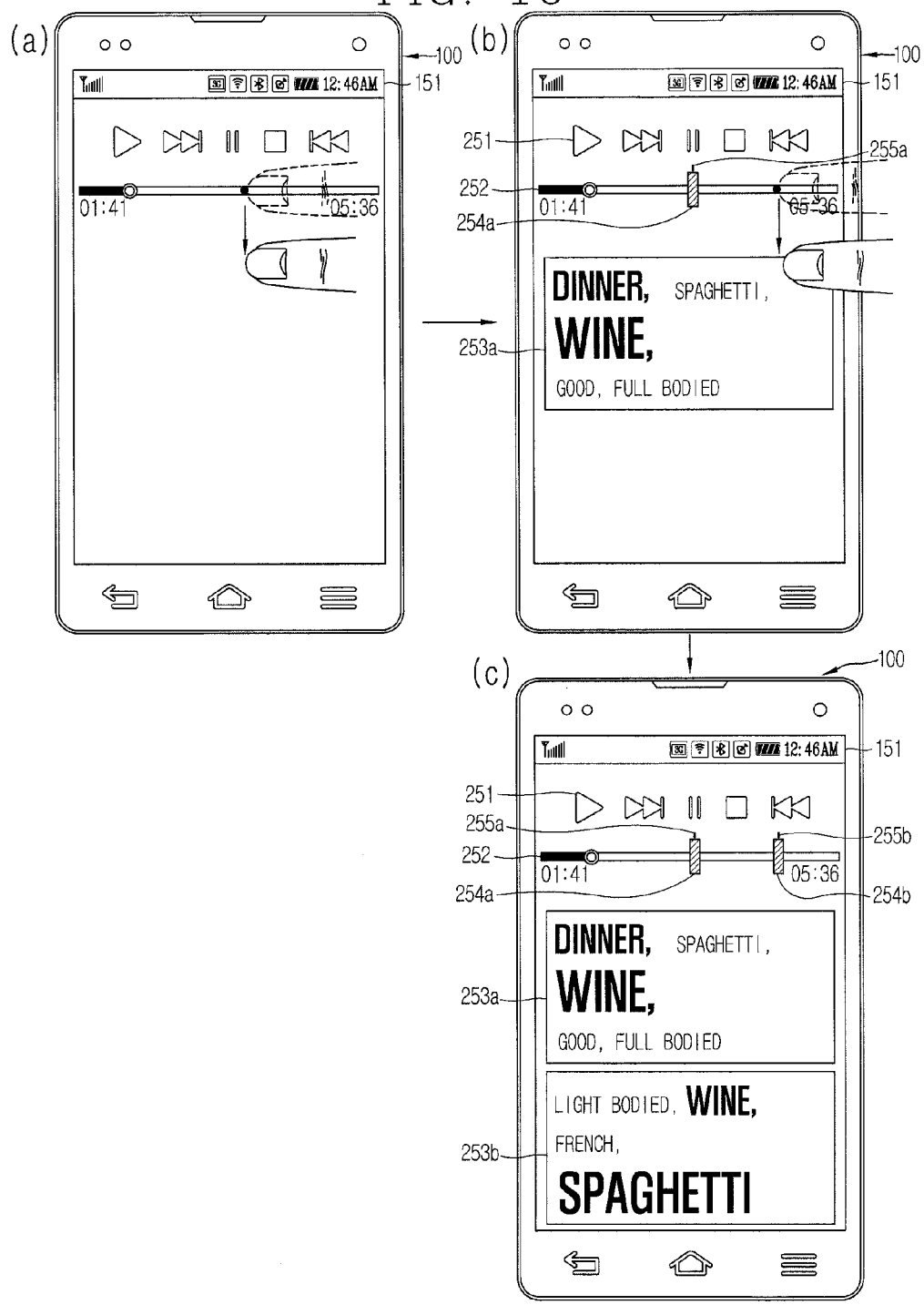
FIGS. 10(*a*) to 10(*c*) are diagrams, each illustrating an operational example in which multiple points are selected on the progress bar.

Next, FIGS. 10(a) to 10(c) are diagrams, each illustrating an operational example in which multiple points are selected on the progress bar. Referring to FIGS. 10(a) and 10(b), when the first point on the progress bar 252 displayed on the display unit 151 is dragged, the controller 180 displays a first image 254a showing the first section, on the display unit 252. Along with this, the controller 180 displays a first object 255(a), which shows that the first point on the progress bar 252 is selected, on a region adjacent to the first point. Also, the controller 180 displays a keyword text data 253a included in the first section, on the display unit 151.

At this time, when a different point on the bar 252 (hereinafter referred to as a "second point") is touched and dragged, the controller 180 selects the second section of the voice data including a second point-in-time at which the voice data corresponds to the second point. The controller 180 displays a second image 254b showing the second section, on the progress bar 252. Along with this, the controller 180 displays a second object 255(b), which shows that the second point on the progress bar 252 is selected, on a region adjacent to the second point. Also, the controller 180 displays a keyword text data 253b included in the second section, on the display unit 151.

As described above, when the multiple points are selected on the progress bar 252, the controller 180 selects multiple sections of the voice data, and displays multiple items of keyword text data included in each of the multiple sections, on the display unit 151.

Further, the controller 180 displays the first object 255(a), the first image 254a showing the first section, and the keyword text data 253a included in the first section in the same color in order to improve visibility of the multiple items of keyword text data included in each of the multiple sections. Also, the controller 180 displays the second object 255(b), the second image 254b showing the second section, and the keyword text data 253b included in the second section in a different color from the color in which the first section is displayed.

Figure 11:
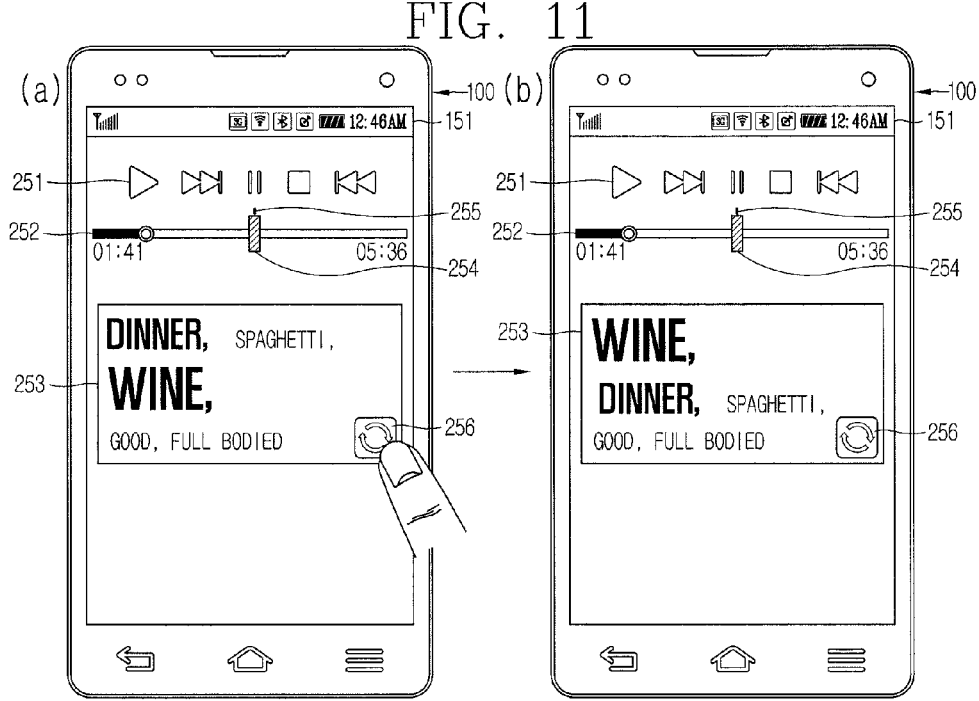
FIGS. 11(*a*) and 11(*b*) are diagrams, each illustrating an operational example in which order in which to display the keyword text data is changed.

Next, FIGS. 11(a) and 11(b) are diagrams, each illustrating an operational example in which the order in which to display the keyword text data is changed. The controller 180 determines at least one of the order in which to display the keyword text data 253 corresponding to the extracted keyword voice data and a method of displaying the keyword text data 253 corresponding to the extracted keyword voice data, based on a result of comparing the first point-in-time of the voice data and a point-in-point at which the extracted keyword voice data is output.

Also, the controller 180 determines at least one of the order in which to display the keyword text data 253 corresponding to the extracted keyword voice data and the method of displaying the keyword text data 253 corresponding to the extracted keyword voice data, based on the number of times that the extracted keyword voice data included in the first section is output.

For example, as illustrated in FIG. 11(a), the controller 180 determines the order in which to display the keyword voice data 253, based on the order of the point-in-time at which the keyword voice data extracted from the first section is output. Accordingly, the items of keyword text data 253 are arranged on the display unit 151, in this order of "dinner, spaghetti, wine, good, and full bodies."

In addition, the controller 180 displays an icon (hereinafter referred to an "order change icon") 256, which corresponds to a function of changing the order in which to display the keyword text data 253, on the display unit 151. Referring to FIG. 11(b), when the order change icon 256 is selected, the controller 180 changes the order in which to display the keyword text data 253.

For example, as illustrated in FIG. 11(b), the controller 180 determines the order in which to display the keyword voice data 253, based on the number of times that the keyword voice data extracted from the first section is output. Accordingly, the items of keyword text data 253 are arranged on the display unit 151, in this order of "wine, dinner, spaghetti, good, and full bodies."

In addition, the order in which to display the keyword text data 253 is determined according to predetermined setting information. The controller 180 analyzes information on a use pattern of the user and displays the keyword text data 253 in the order of display that he/she prefers.

In addition, as illustrated in FIGS. 11(a) and 11(b), the controller 180 determines at least one of the font color, the font size, and the font thickness of each keyword text data 253, based on the number of times that the keyword voice data extracted from the first section is output. Accordingly, the keyword text data that is output the largest number of times in the first section (for example, "wine") is displayed most largely, and the keyword text data that is output the second largest number of times (for example, "dinner") is displayed secondly most largely.

Figure 12:
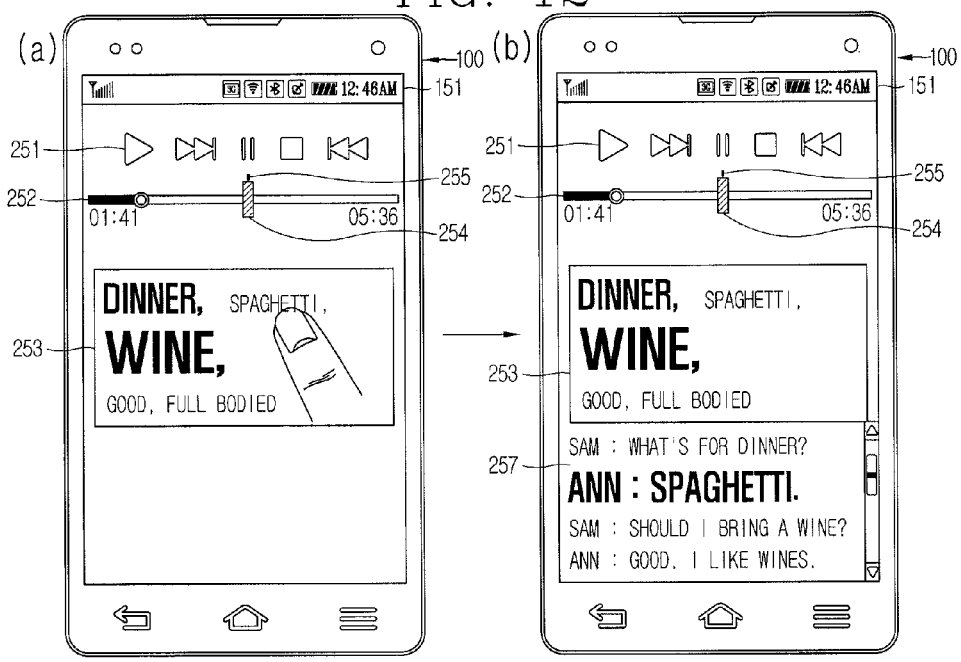
FIGS. 12(*a*) and 12(*b*) and 13(*a*) to 13(*c*) are diagrams, each illustrating an operational example in which first text data relating to the selected keyword text data is displayed.

Next, FIGS. 12(a) and 12(b) and 13(a) to 13(c) are diagrams, each an operational example in which the first text data 257 relating to the selected keyword text data 253 is displayed. Referring to FIG. 12(a), the display unit 151 displays the keyword text data 253 extracted from the first section. At this time, when at least one of the items of keyword text data 253 (for example, "spaghetti") is selected, the controller 180 detects the point-in-time at which the keyword voice data corresponding to the selected keyword text data is output.

Thereafter, referring to FIG. 12(b), the controller 180 selects the section of the voice data including the detected output point-in-time (hereinafter referred to the "first section") and converts the voice data included in the selected first section (hereinafter referred to a "first voice data) to the text data. The controller 180 then displays the resulting text data (hereinafter referred to as the "first text data) 257 on the display unit 151.

In addition, the previously-selected keyword text data (for example, "spaghetti") of the items of first text data 257 is displayed in a highlighted manner.

Accordingly, the previously-selected keyword text data of the items of first text data 257 is displayed larger than the other items of text data. As illustrated, an entire sentence including the previously-selected keyword text data (for example, "spaghetti") of the items of first text data 257, and speaker information (for example, "Ann: Spaghetti.") relating to this are displayed in a highlighted manner.

Also, as illustrated, the display unit 151 displays a scroll bar, along with the first text data 257. Thus, the user can read different text data through the use of the touch input to the scroll bar.

Figure 13:
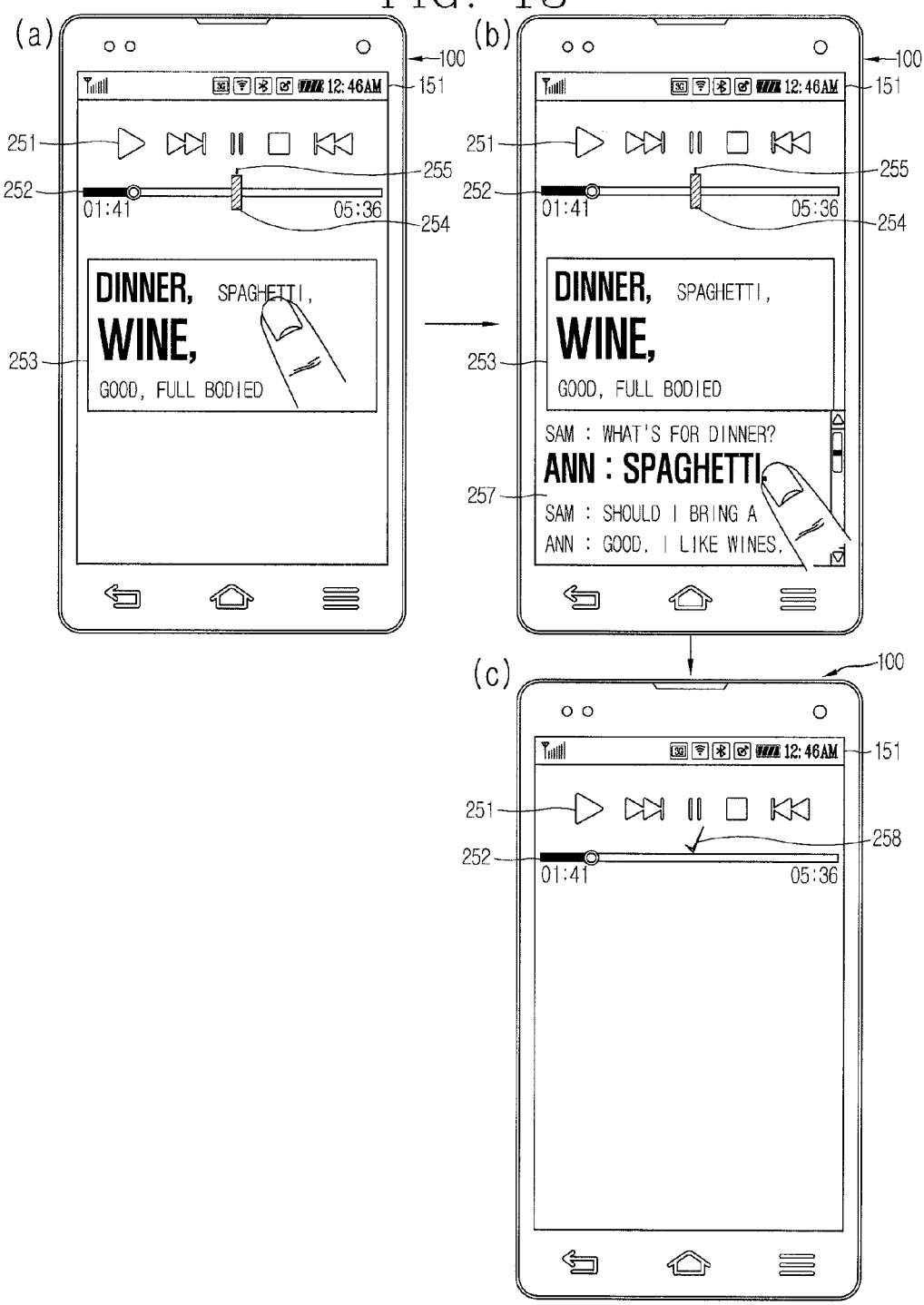

In addition, referring FIGS. 13(a) and 13(b), when at least one part of the items of first text data 257 (for example, any one of sentences included in the first text data 257 (for example, "Spaghetti.") is selected, the controller 180, as illustrated in FIG. 13(c), displays the object (hereinafter referred to as the "second object) 258 showing the point-in-time at which the voice data corresponding to the selected sentence is output, on the progress bar 252.

The second object 258 includes an icon, a widget, an application execution menu, a thumbnail image, and the likes. In addition, when the progress bar 252 showing the reproduction progress state of the moving image data is displayed on the display unit 151, the controller 180 displays the thumbnail image of a frame displayed at the time of the output of the moving image data, as the second object, which corresponds to the selected sentence, the progress bar 252.

Figure 14:
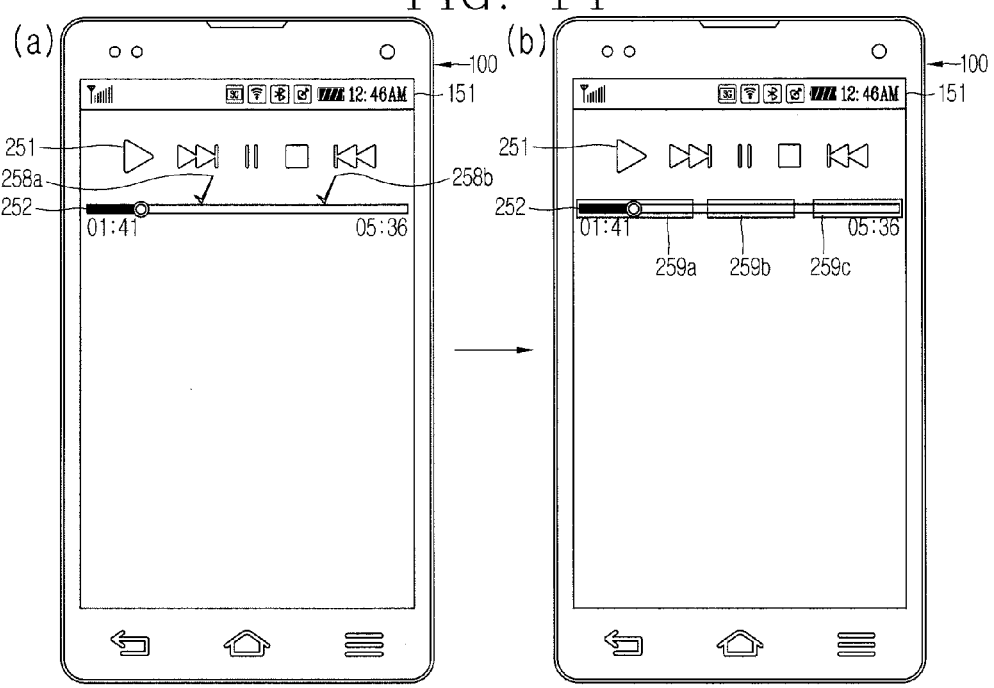
FIGS. 14(*a*) and 14(*b*), 15(*a*) and 15(*b*), 16(*a*) and 16(*b*), and 17(*a*) and 17(*b*) are diagrams, each illustrating an operational example in which the progress bar is divided into multiple regions.

Next, FIGS. 14(a) and 14(b), 15(a) and 15(b), 16(a) and 16(b), and 17(a) and 17(b) are diagrams, each illustrating an operational example in which the progress bar 252 is divided into multiple regions. When the two or more sentences (for example, the two sentences) of the sentences included in the items of first text data 257 are selected, the controller 180, as illustrated in FIG. 14(a), displays the two second objects 258(a) and 258(b) showing the output points-in-time of the items of voice data, which corresponds to the selected two sentences, respectively, on the progress bar 252.

Thereafter, referring to FIG. 14(b), the controller 180 divides the progress bar 252 into multiple regions (for example, three regions) (hereinafter referred to as 'first to third regions) 259(a) to 259(c), based on display positions of the second objects 258(a) and 258(b) on the progress bar 252.

Figure 15:
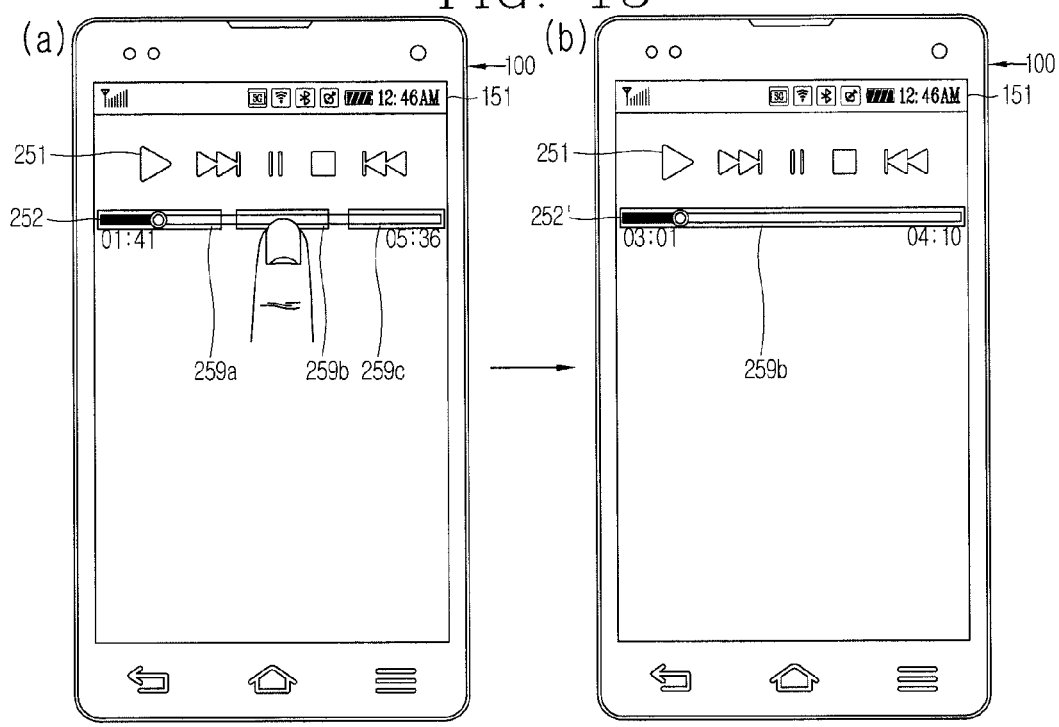

In addition, the controller 180 divides the progress bar 252 into the first to third regions 259(a) to 259(c), and thus divides a file of the voice data into three files (hereinafter referred to as first to third files), based on the first to third regions 259(a) to 259(c). Referring to FIG. 15(a), when at least one (for example, the second region) 259(b) of the first to third regions 259(a) to 259(c) is selected, the controller 180 displays, as illustrated in FIG. 15(b), enlarges the second region 259(b) and displays the enlarged second region 259(b) on the display unit 151.

Accordingly, one part 252' of the progress bar corresponding to the selected second region 259(b) is displayed on the display unit 151. As illustrated, the one part 252' of the progress bar is displayed on the display unit 151, and thus a starting point-in-time (for example, "03:01") and an ending point-in-time (for example, "04:10") of the second file of the voice data are displayed.

As illustrated, an icon 251 corresponding to a function of reproducing the second file is displayed on the display unit 151. When the icon 251 is selected, the controller 180 reproduces the second file of the voice data. Also, the controller 180 again displays a screen, on which the progress bar 252 including the first to third regions 259(a) to 259(c) is displayed, on the display unit 151, based on the input to a user input unit 130 (for example, the input through the use of a backspace key).

Referring to FIGS. 16(a) and 16(b) and 17(a) and 17(b), when the predetermined touch input is detected on at least one of the first to third regions 259(a) to 259(c), the controller 180 edits the divided file of the voice data according to the touched-on region.

Figure 16:
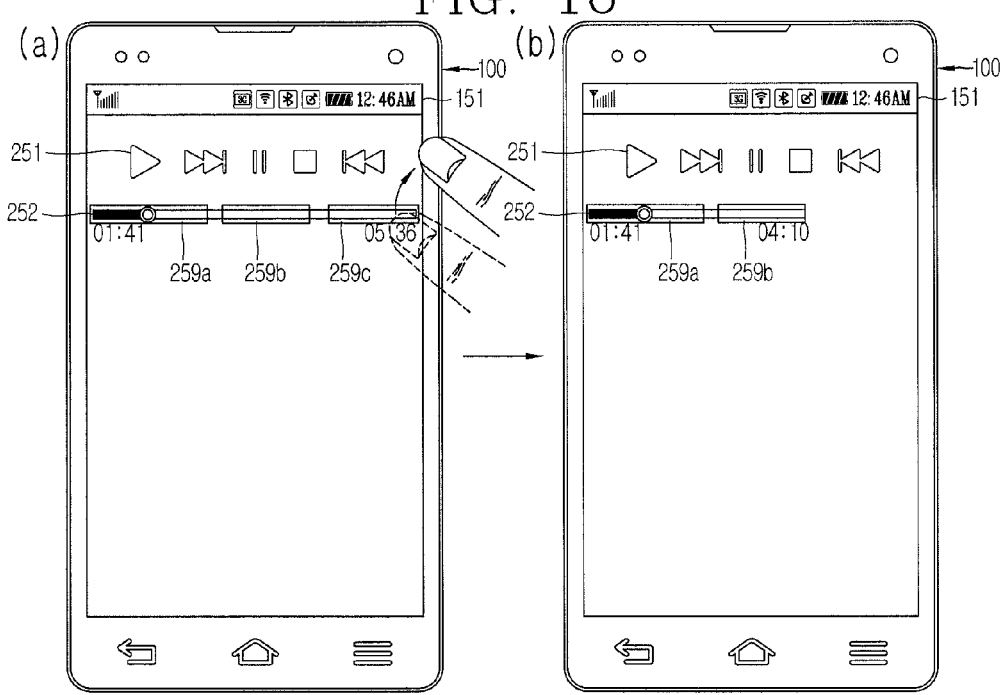

Specifically, referring to FIG. 16(a), when at least any one (for example, the third region 259(c)) of the first to third regions 259(a) to 259(c) is dragged in a predetermined direction, the controller 180 makes the third region 259(c) of the progress bar 252 disappear from the display unit 151 as illustrated in FIG. 16(b). Along with this, the controller 180 deletes the third file of the voice data.

Figure 17:
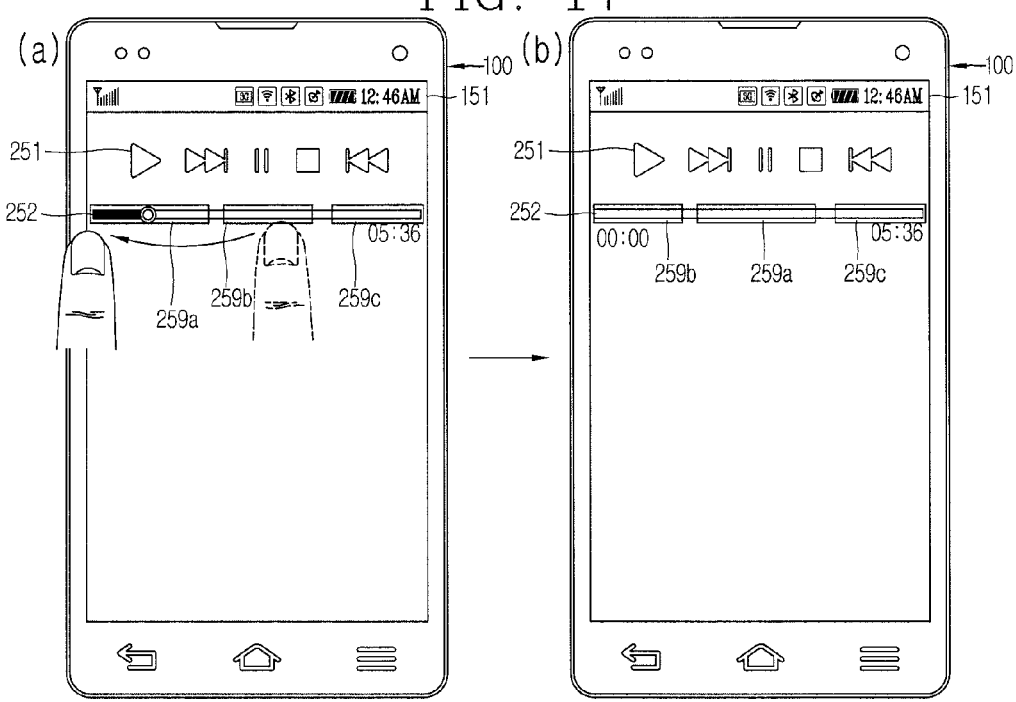

In addition, referring to FIG. 17(a), when at least any one (for example, the second region 259(b)) of the first to third regions 259(a) to 259(c) is dragged in the direction of the first region 259(a), the controller 180, as illustrated in FIG. 17(b), exchanges positions of the first and second regions 259(a) and 259(b) of the progress bar 252. Accordingly, when the use reproduces the voice data, the controller 180 first outputs the second file of the voice data, and subsequently outputs the first file.

Next, FIGS. 18(a) and 18(b) and 19(a) to 19(b) are diagrams, each illustrating an operational example in which the second text data 257' is displayed based on the touch input to the first text data 257. Referring to FIG. 18(a) and FIG. 19(a), as described referring to FIG. 12(b), the display unit 151 displays the keyword text data 253 and the first text data 257 including the previously-selected keyword text data (for example, "spaghetti").

At this time, when the touch input is detected on the first text data 257, the controller 180 selects a new section (hereinafter referred to as "the second section") from the voice data, based on the information on the property of the detected touch input, and converts the voice data included in the second section (hereinafter referred to as the "second voice data") to the text data (hereinafter referred to as the "second text data"), thereby displaying the result to the display unit 151.

Figure 18:
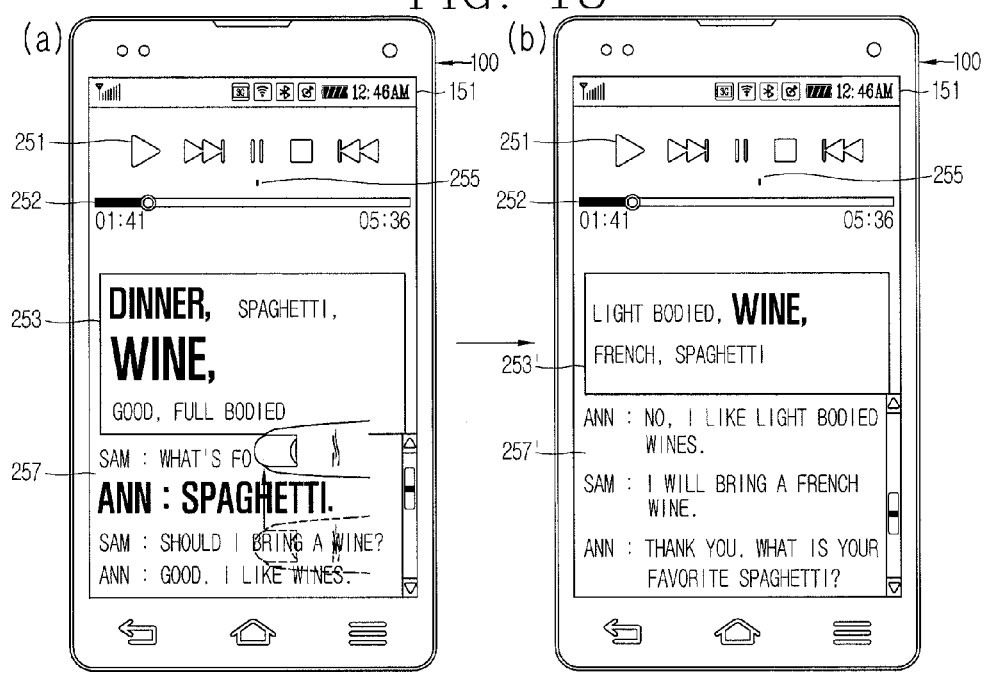
FIGS. 18(*a*) and 18(*b*) and 19(*a*) to 19(*b*) are diagrams, each illustrating an operational example in which second text data is displayed based on a touch input to the first text data.

Specifically, when, as illustrated in FIG. 18(a), the drag input is detected on the first text data 257 displayed on the display unit 151, in the first direction (for example, in the down to top direction), the controller 180, as illustrated in FIG. 18(*b*), selects the second section, based on the drag distance, and displays the second text data 257' that results from converting the second voice data included in the second section, through the use of the STT algorithm.

At this time, the second text data 257' may be text data that includes no first text data 257, and may be text data that includes at least one part of the first text data 257. In addition, as illustrated, the controller 180 displays the object (referred to above as the "first object) 255, which shows the point-in-time at which the voice data corresponding to the second text data 257' is output, on the display unit 151. Accordingly, the position of the first object 255 displayed on the first point on the existing progress bar 252 is moved.

Also, as illustrated, the controller 180 extracts at least one of the items of keyword voice data included in the second section, converts the extracted keyword voice data to the keyword text data 253' and displays the resulting keyword text data 253' on the display unit 151. That is, when, as illustrated in FIG. 18(*a*), the keyword text data 253 included in the first text data 257 is displayed on the display unit 151 and thereafter the section is changed, the second text data 257' included in a new section, as illustrated in FIG. 18(*b*), is displayed on the display unit 151, and the keyword text data 253' included in the second text data 257' is displayed on the display unit 151.

Figure 19:
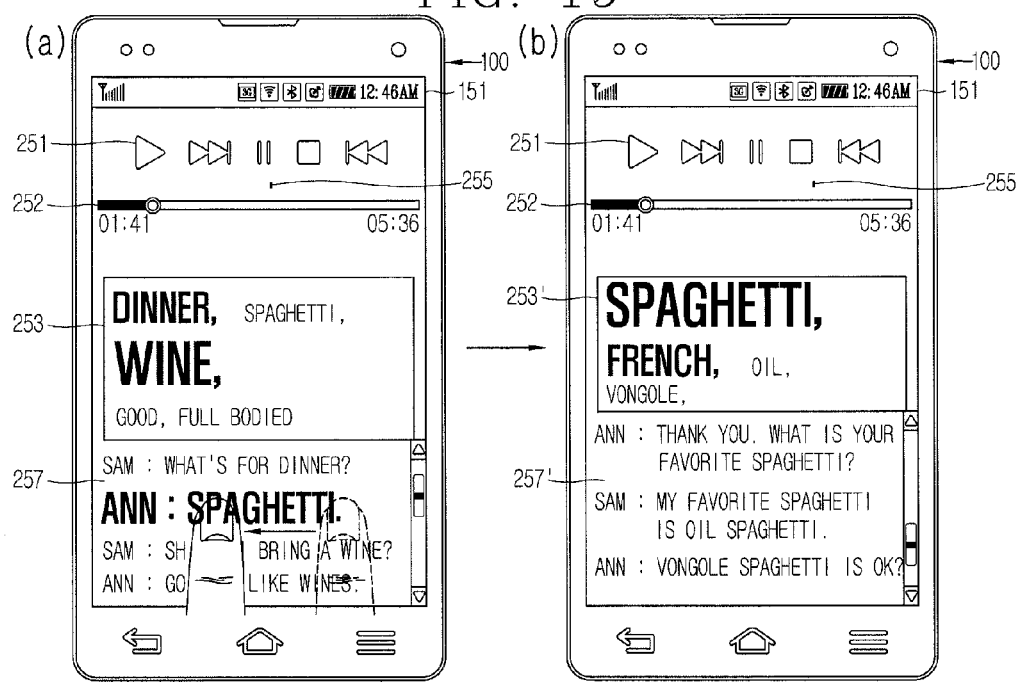

In addition, when, as illustrated in FIG. 19(*a*), the drag input is detected on the first text data 257 displayed on the display unit 151, in the second direction (for example, in the right to left direction), the controller 180, as illustrated in FIG. 19(*b*), selects the second section. At this time, the second section is a different section from the first section, as a section that includes the keyword voice data corresponding to the keyword text data (for example, "spaghetti") that has previously been selected from the voice data.

Accordingly, the controller 180 displays the second text data 257' that results from converting the second voice data included in the second section through the use of the STT algorithm. Also, a change is made from the first section to the second section, and thus the position of the first object 255 displayed on the first point on the existing progress bar 252 is moved.

Also, as illustrated, the controller 180 extracts at least one of the items of keyword voice data included in the second section, converts the extracted keyword voice data to the keyword text data 253' and displays the resulting keyword text data 253' on the display unit 151.

Figure 20:
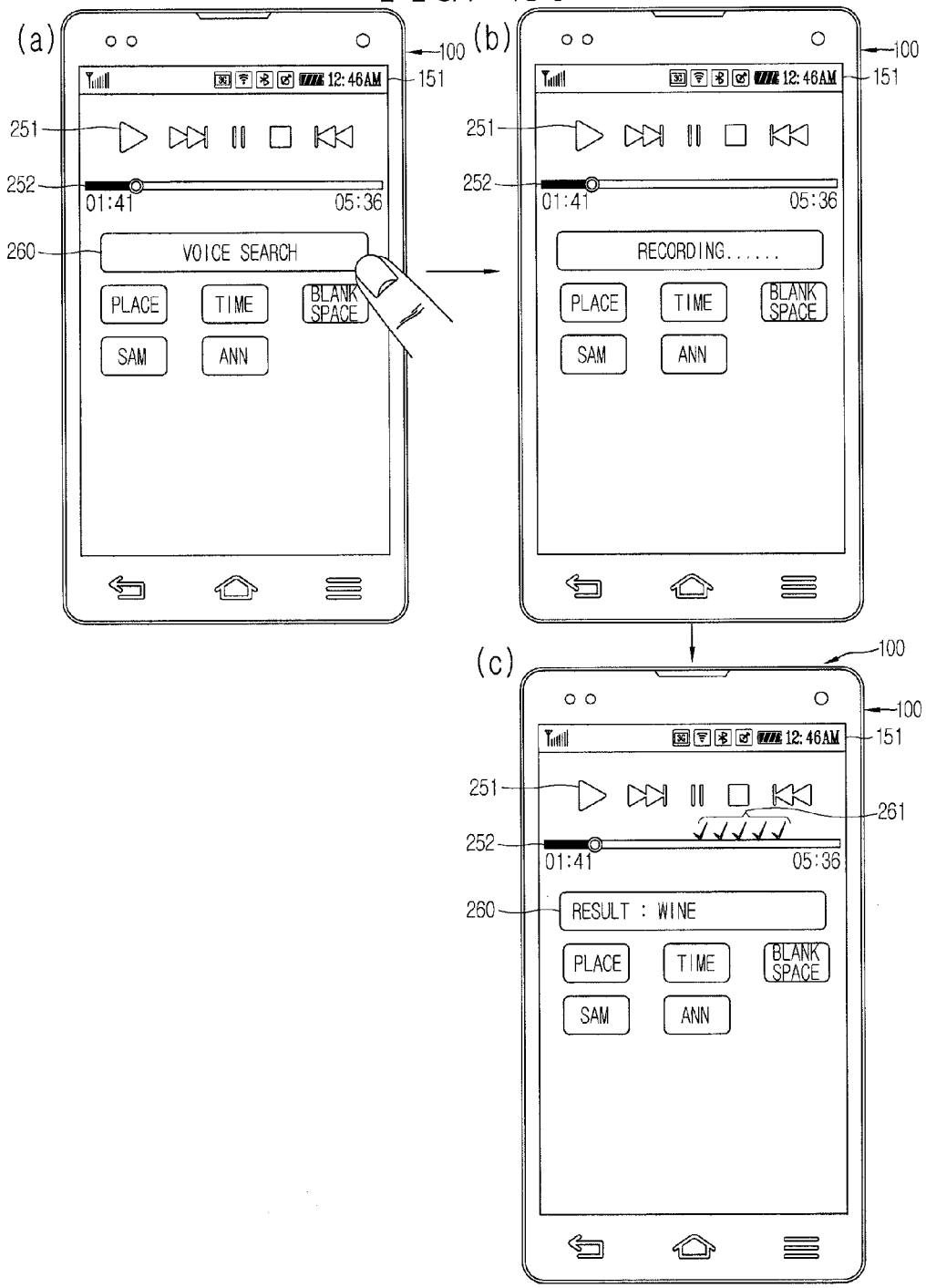
FIGS. 20(*a*) to 20(*c*), 21(*a*) and 21(*b*), 22(*a*) and 22(*b*), and 23(*a*) and 23(*b*) are diagrams, each illustrating an operational example in which a third object is displayed at a point-in-time at which the keyword data, which is input, is output from the voice data.

Next, FIGS. 20(*a*) to 20(*c*), 21(*a*) and 21(*b*), 22(*a*) and 22(*b*), and 23(*a*) and 23(*b*0 are diagrams, each illustrating an operational example in which a third object 260 is displayed at a point-in-time when the keyword data, which is input, is output from the voice data. Referring to FIG. 20(*a*) and FIG. 21(*a*), the user input unit 130 is formed in such a manner as to receive the input of the keyword data.

Specifically, the user input unit 130 includes a microphone 122 that can receive the input of the keyword voice data and the display unit 151 that can receive the input of the keyword text data. Further, the user input unit 130 may include a camera 121 that can obtain the image data including the keyword text data. In this instance, the controller 180 extracts the keyword text data from the image data.

Referring to FIGS. 20(*a*) and 20(*b*), when the icon (hereinafter referred to as a "voice retrieval icon") 260 corresponding to a function of retrieving the voice, displayed on the display unit 151, is selected, the controller 180 receives the input of the keyword voice data (for example, "wine") through the microphone 122.

Thereafter, as illustrated in FIG. 20(*c*), the controller 180 converts the keyword voice data, which is input to it, to the text data and displays the result on the display unit 151. As illustrated, the text data may be displayed on a position on which the voice retrieval icon 260 has been displayed.

Also, the controller 180 extracts the point-in-time at which the keyword voice data is output from the voice data, and displays the object 261 (hereinafter referred to as the "third object") on the point on the progress bar 252, corresponding to the point-in-time at which the keyword voice data is output. As illustrated, when the keyword voice data is output multiple times from the voice data, the controller 180 displays the multiple third objects 261 corresponding to the number of multiple times, respectively, on the progress bar 252.

Figure 21:
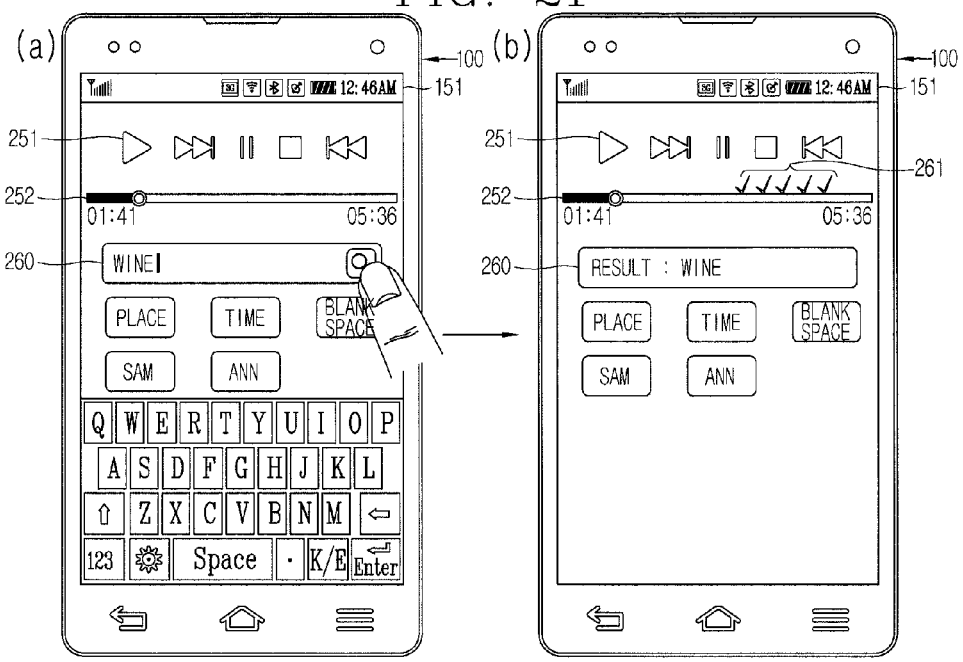

Referring to FIG. 21(*a*), the controller 180 receives the input of the keyword text data (for example, "wine"), based on the input to a virtual keypad displayed on the display unit 151. The controller 180 displays the keyword text data, which is input to it, on the retrieval window 260.

Thereafter, as illustrated in FIG. 21(*b*), the controller 180 extracts the point-in-time at which the keyword voice data is output from the voice data, and displays the third object 261 on the point on the progress bar 252, corresponding to the point-in-time at which the keyword voice data is output.

Figure 22:
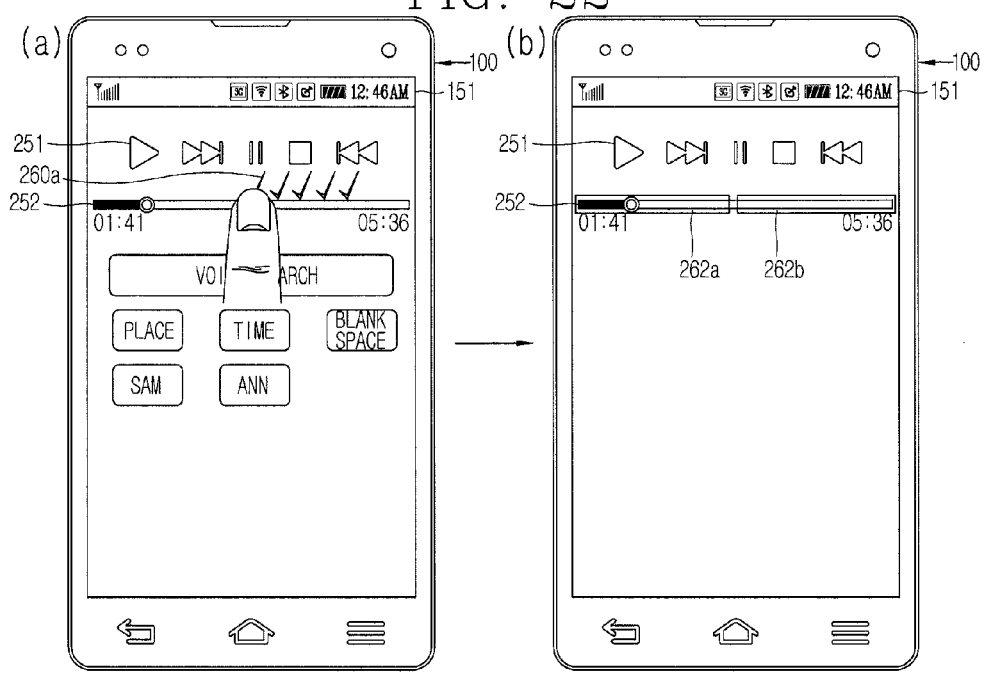

Referring to FIG. 22(*a*), when at least one 260*a* of the third objects 261 displayed on the progress bar 252 is selected, the controller 180, as illustrated in FIG. 22(*b*), divides the progress bar 252 into multiples regions (for example, two regions) (hereinafter referred to as "first and second regions) 262A and 262B, based on a display position of the third object 261*a* selected on the progress bar 262.

In addition, the controller 180 divides the progress bar 252 into the first and second regions 262*a* to 262*b*, and thus divides the file of the voice data into two files (hereinafter referred to as first and second files), based on the first and second regions 262*a* to 262*b*.

Further, referring to FIG. 23(*a*), when the predetermined touch input (for example, a pinch-in touch input) is detected on one point on the progress bar 252 (for example, one point including any one 260*a* of the third objects 260), the controller 180, as illustrated in FIG. 23(*b*), enlarges the point on which the touch input is detected.

The controller 180 analyzes the voice data included in the section corresponding to the point on which the touch input is detected. The controller 180 displays the extent to which the voice data is matched to the keyword text data, which is input to it.

Accordingly, the controller 180 displays the third object 260*a* on the point on the progress bar 252, to which the voice data is matched by a first matching rate (for example, 90% or more) that is predetermined, and displays other objects (hereinafter referred to as "fourth objects") 263*a* to 263*c* on the point to which the voice data is matched by a second matching rate (for example, 60% to 90%) that is predetermined.

Figure 24:
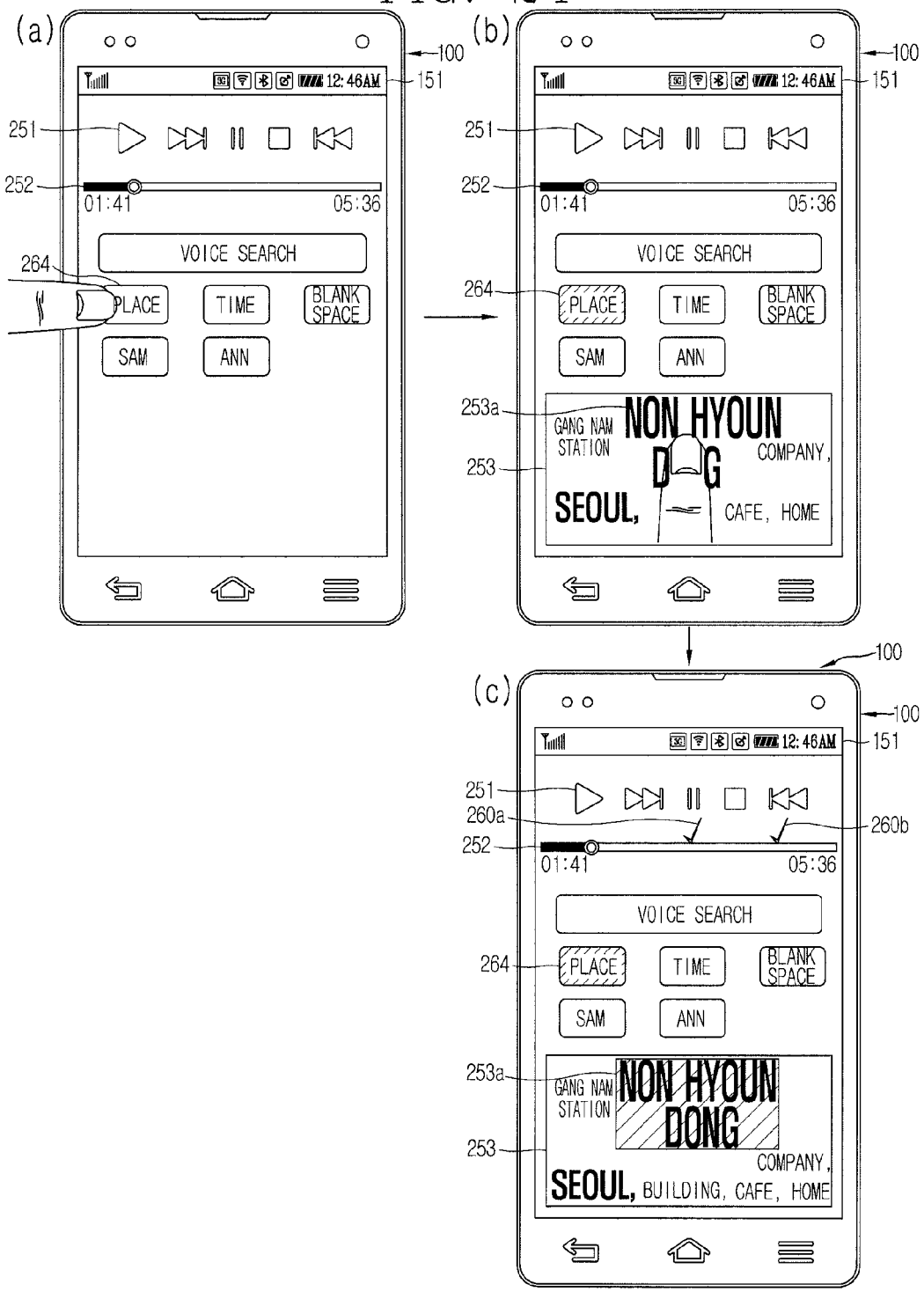
FIGS. 24(*a*) to 24(*c*), 25(*a*) and 25(*b*), 26(*a*) to 26(*c*), and 27(*a*) to 27(*c*) are diagrams, each illustrating an operational example in which when a menu item is selected, keyword voice data relating to the selected menu item is extracted.

FIGS. 24(*a*) to 24(*c*), 25(*a*) and 25(*b*), 26(*a*) to 26C, and 27(*a*) to 27(*c*) are diagrams, each illustrating an operational example in which when a menu item is selected, the keyword voice data 253 relating to the selected item is extracted. Referring to FIG. 24(*a*), the display unit 151 displays at least one menu item. As illustrated, the menu item includes at least one of a place extraction icon 264, a time extraction icon, and a blank space extraction icon.

At this time, when the place extraction icon 264 is selected, referring to FIG. 24(*b*), the controller 180 extracts the keyword voice data relating to "place" from the voice data. Also, the controller 180 converts the extracted keyword voice data to the keyword text data 253 and displays the resulting keyword text data 253 on the display unit 151.

As illustrated, the place extraction icon 264 is displayed in a highlighted manner in order to show that the place extraction icon 264 is selected. In addition, objects showing the point-in-time at which the keyword voice data relating to "place" is output from the voice data may be displayed on the progress bar 252.

Referring back to FIG. 24(*b*), when any one (for example, "Non Hyoun Dong") 253*a* of the items of keyword text data displayed 253 on the display unit 151 is selected, referring to FIG. 24(*c*), the controller 180 displays the objects (referred to above as the "third object") 260*a* and 260*b*, each of which shows the point-in-time at which the keyword text data 253*a*, "Non Hyoun Dong", is output from the voice data, on the progress bar 252.

Figure 25:
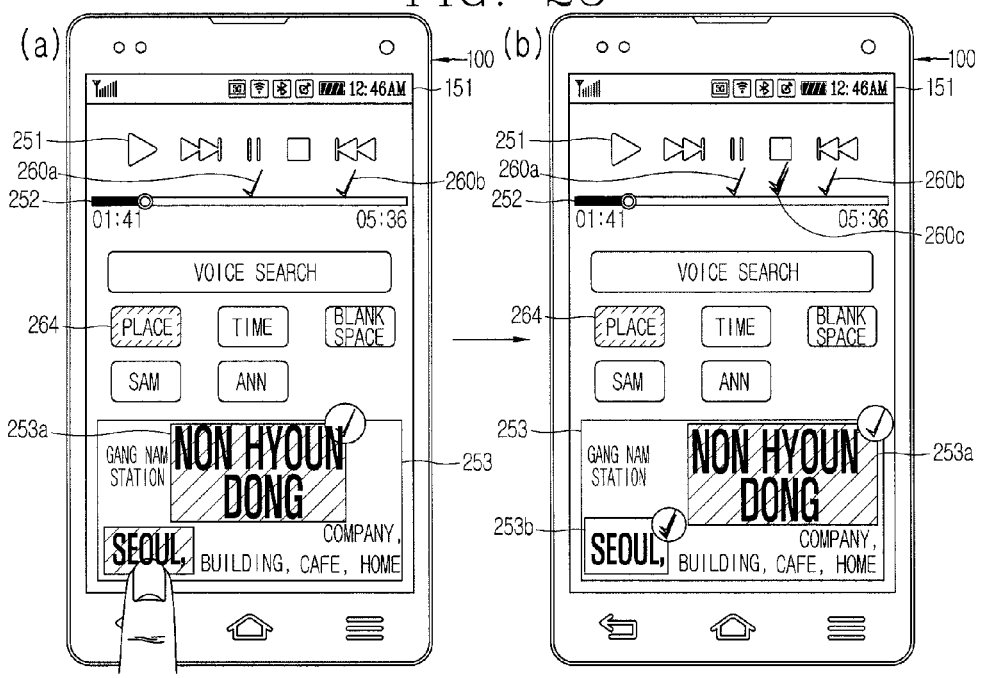

Also, as illustrated, the keyword text data 253*a*, "Non Hyoun Dong", is displayed in a highlighted manner, in order to show that the keyword text data 253*a*, "Non Hyoun Dong", of the items of keyword text data 253 is selected. In addition, as illustrated in FIG. 25(*b*), when another one (for example, "Seoul") 253*b* of the items of keyword text data 253 is selected, referring to FIG. 25(*b*), the controller 180 displays the third object 260*c* that shows the point-in-time at which the keyword text data 253*b*, "Seoul" is output from the voice data, on the progress bar 252.

At this time, as illustrated, the third objects 260*a* and 260*b*, each of which shows the point-in-time at which the keyword text data 253*a*, "Non Hyoun Dong", is output, and the third object 260*c* that shows the point-in-time at which the keyword text data 253*b*, "Seoul", are displayed in a mutually-distinguishable manner. For example, the third objects 260*a* and 260*b*, each of which shows the point-in-time at which the keyword text data 253*a*, "Non Hyoun Dong", is output, and the third object 260*c* that shows the point-in-time at which the keyword text data 253*b*, "Seoul", is output are displayed in such a manner that they are different from each other in at least one of color, brightness, shape, size, and transparency.

Also, as illustrated, the controller 180 can display a shape of the third object that shows the point-in-point at which the keyword text data 253*a*, "Non Hyoun Dong", is output, along with the keyword text data 253*a* "Non Hyoun Dong", and may display the shape of the third object that shows the point-in-point at which the keyword text data 253*b*, "Seoul", is output, along with the keyword text data 253*b*, "Seoul".

Also, the controller 180 may display the keyword text data 253*a*, "Non Hyoun Dong", and the third objects 260*a* and 260*b*, each of which shows the point-in-time at which the keyword text data 253*a*, "Non Hyoun Dong", is output, in the same color (for example, a first color), and may display the keyword text data 253*b*, "Seoul", and the third object 260*c* that shows the point-in-time at which the keyword text data 253*b*, "Seoul", is output, in a second color different from the first color.

In addition, when any one of the third objects 260*a* to 260*c* displayed on the progress bar 252 is selected, the controller 180 detects the point-in-time at which the voice data corresponds to the selected third object, and outputs the voice data corresponding to the detected point-in-time for a predetermined time (for example, three seconds). While the voice data corresponding to the detected point-in-time is output, a size of the selected third object is changed.

Also, while the voice data corresponding to the detected point-in-time is output, when the determined touch input (for example, the drag input in the right to left direction) is detected on the display unit 151, the controller 180 automatically selects the third object, displayed next to the selected third object, of the third objects 260*a* to 260*c*. Accordingly, the voice data is output that corresponds to the point-in-time corresponding to the automatically-selected third object.

Also, when any one of the third objects 260*a* to 260*c* displayed on the progress bar 252 is selected, the controller 180 divides the progress bar 252 into the multiple regions (hereinafter referred to as "the first and second regions"), based on the point on the selected third object. The controller 180 divides the file of the voice data into two files (hereinafter referred to as first and second files), based on the first and second regions, and stores the first and second files that result from the division.

Referring to FIG. 26(*a*), when the blank space extraction icon 265 is selected from the menu items, the controller 180, as illustrated in FIG. 26(*b*), extracts a blank space point-in-time from the items of voice data, and displays the third objects 260*a* to 260*c*, each of which shows the blank space point-in-time, on the progress bar 252.

Thereafter, when any one 260*c* of the third objects 260*a* to 260*c* is selected, the blank space point-in-time corresponding to the selected third object 260*c* is detected. Referring to FIG. 26©, the controller 180 outputs the voice data that is present from before a predetermined point-in-time to after a predetermined point-in-time, with the detected blank space point-in-time defined as a reference. For example, the controller 180 outputs the voice data (for example "okay") that is present before the detected blank space point-in-time.

And after time elapses from the blank space point-in-time, the controller 180 outputs the voice data (for example, "good") that is present after the blank space point-in-time. In addition, the controller 180 may convert the voice data that is present from before the predetermined point-in-time to after the predetermined point-in-time, with the detected blank space point-in-time defined as the reference, to the text data, and may display the result on the display unit 151.

Figure 27:
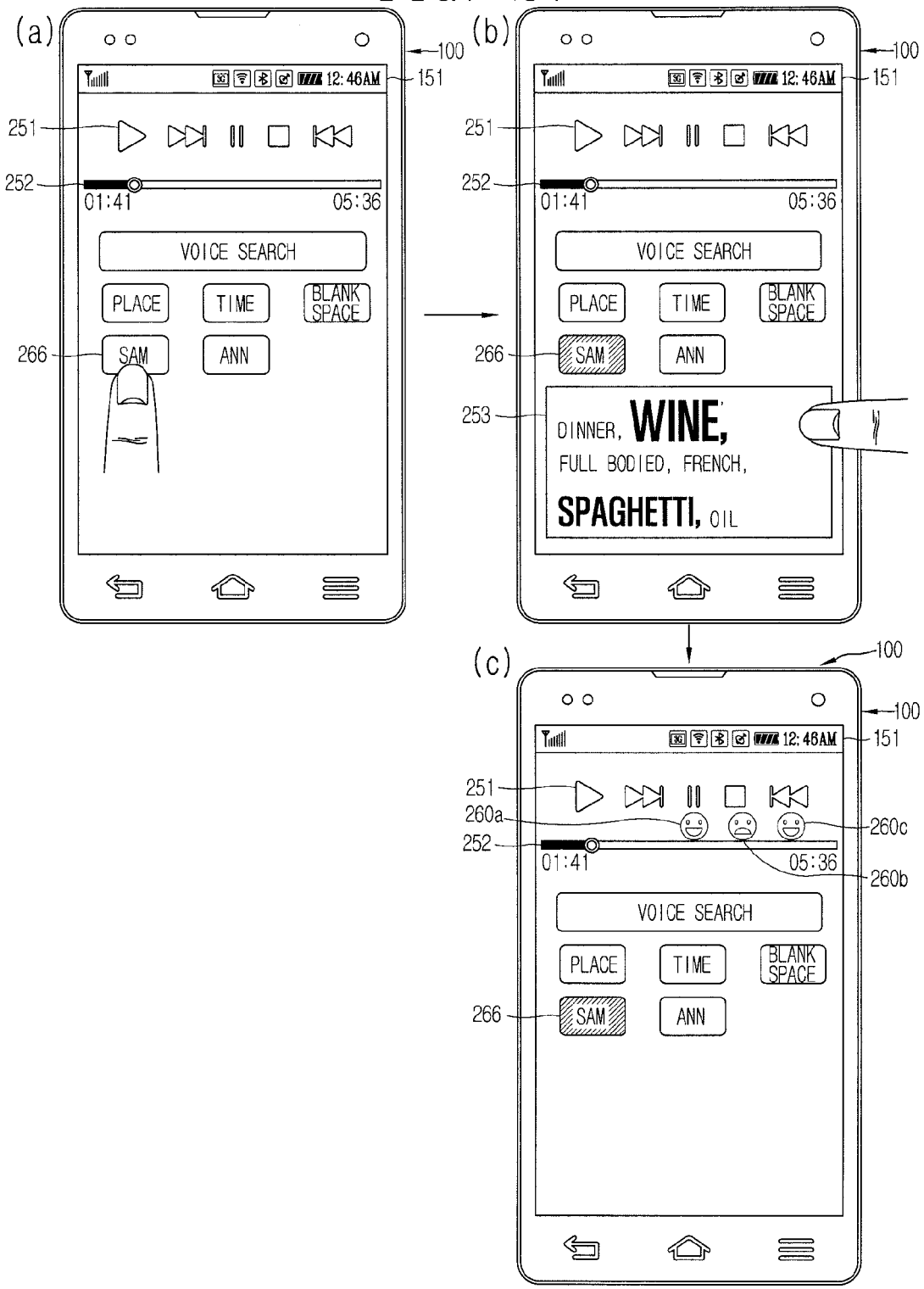

Referring to FIG. 27(*a*), the controller 180 analyzes the voice data. The controller 180 makes the menu item displayed on the display unit 151 reflect a result of analyzing the voice data. As illustrated, the menu item includes icons, each of which corresponds to speaker information relating to the voice data, (for example "Sam, Ann") (hereinafter referred to as "first and second speaker icons).

At this time, when the first speaker icon 266 is selected, the controller 180 extracts a portion of the voice data, corresponding to a voice of the first speaker from the voice data, based on information on the voice of the first speaker. At this time, the controller 180 may display an object, which shows the point-in-time at which the voice data corresponding to the voice of the first speaker is output, on the progress bar 252.

The controller 180 extracts the keyword voice data from the extracted portion of the voice data, and displays the keyword text data 253, which results from converting the keyword voice data through the use of the STT algorithm, on the display unit 151.

In addition, when any one (for example, "wine") of items of keyword text data 253 is selected, the controller 180, as illustrated in FIG. 27(*c*), displays the third objects 260*a* to 260*c*, each of which shows the point-in-point at which the selected keyword text data is output, on the display unit 151.

At this time, as illustrated, the controller 180 detects the information on the voice from the keyword voice data corresponding to the keyword text data, and recognizes an emotional state of the first speaker. When the first speaker says the keyword voice data with delight, the controller 180 displays the third objects 260*a* and 260*c*, each having a first shape, on the progress bar 252.

And when the first speaker says the keyword voice data with anger, the controller 180 displays the third object 260*b* having a second shape, on the progress bar 252. The controller 180 may provide statistical information relating to the emotional state of the first speaker. In addition, when any one of the third objects 260*a* to 260*c* is dragged in a predetermined direction, the controller 180 displays the section of the voice data corresponding to the selected third object on a separate region of the display unit 151. The user can cause the voice data corresponding to the displayed section to be output, by selecting the displayed section.

In addition, the controller 180 can take a photograph with the camera 121 while recording the voice data. Thereafter, the controller 180 displays the object (a thumbnail image corresponding to the photograph) showing the point-in-time at which the photograph is taken, on the progress bar 252, while displaying the progress bar 255 corresponding to the recorded voice data on the display unit 151. Likewise, the controller 180 receives the input of the text data while recording the voice data, and then displays the object showing the point-in-time, at which the text data is input to it, on the progress bar 252.

Also, the controller 180 divides the progress bar 252 into the multiple regions, based on the points on the progress bar 252, on which the objects are displayed. Furthermore, the controller 180 divides the recorded items of voice data into the multiple files, based on the multiple regions that result from the division, and stores at least one of the multiple files that results from the division.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

With regard to the mobile terminal described above, the configuration and method of the embodiments described above are not given any limitation to their applications, but all of, or some of the embodiments may be selectively combined with each other in a manner that creates various modifications.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a wireless communication unit configured to wirelessly communicate with at least one other terminal;
a memory configured to store recorded voice data;
a display unit configured to display a progress bar representing a reproduction progress of the recorded voice data; and
a controller configured to:
select a section of the recorded voice data in response to a user input applied to the progress bar,
determine a number of voice keywords based on the user input applied to the progress bar, wherein the number of voice keywords is varied according to the user input applied to the progress bar,
select the determined number of voice keywords from the selected section of the recorded voice data based on a predetermined criterion,
convert the voice keywords included in the selected section of the recorded voice data to text keywords,
distinctively display the text keywords on the display unit, wherein at least one of a font color, a font size, and a font thickness of each text keyword is determined based on the number of times that each text keyword is included in the selected section of the recorded voice data,
select a text keyword among the text keywords in response to a touch applied to the text keyword, and
display an entire sentence including the selected text keyword and speaker information related to a speaker who said the entire sentence.

2. The mobile terminal of claim 1, wherein the controller is further configured to display a display object on the progress bar showing the selected section of the recorded voice data.

3. The mobile terminal of claim 2, wherein the user input includes a touching of the progress bar, and
wherein the controller is further configured to detect an extent to which the touching is applied to the display object, and determine at least one of a length of the selected section of the recorded voice data and the determined number of voice keywords based on the extent to which the touching is applied.

4. The mobile terminal of claim 3, wherein the touching of the progress bar includes one of a) touching the progress bar and dragging the touching in a direction away from the progress bar, b) maintaining the touching of the progress bar for a predetermined amount of time, c) touching the progress bar and dragging the touching in a direction along the progress bar, and d) touching the progress bar at first and second points, and
wherein the determined at least one of the length of the selected section of the recorded voice data and the determined number of voice keywords corresponds to
a) a length of the dragging away from the progress bar, b) the predetermined amount of time of the touching, c) a length of the dragging along the progress bar, and d) a distance between the first and second points on the progress bar.

5. The mobile terminal of claim 4, wherein the controller is further configured to change a shape of the display object to indicate the determined at least one of the length of the selected section of the recorded voice data.

6. A method of controlling a mobile terminal, the method comprising:

storing, via a memory, recorded voice data;

displaying, via a display unit, a progress bar representing a reproduction progress of the recorded voice data;

selecting, via the controller, a section of the recorded voice data in response to a user input applied to the progress bar;

determining the number of voice keywords based on the user input applied to the progress bar, wherein the number of voice keywords is varied according to the user input applied to the progress bar;

selecting, via the controller, the determined number of voice keywords from the selected section of the recorded voice data based on a predetermined criterion;

converting, via the controller, the voice keywords included in the selected section of the recorded voice data to text keywords;

distinctively displaying, via the display unit, the text keywords, wherein at least one of a font color, a font size, and a font thickness of each text keyword is determined based on the number of times that each text keyword is included in the selected section of the recorded voice data;

selecting a text keyword among the text keywords in response to a touch applied to the text keyword; and displaying an entire sentence including the selected text keyword and speaker information related to a speaker who said the entire sentence.

7. The method of claim 6, further comprising displaying a display object on the progress bar showing the selected section of the recorded voice data.

8. The method of claim 7, wherein the selection signal includes a touching of the progress bar, and wherein the method further comprises detecting an extent to which the touching is applied to the display object, and determining at least one of a length of the selected section of the recorded voice data and the determined number of voice keywords based on the extent to which the touching is applied.

9. The method of claim 8, wherein the touching of the progress bar includes one of a) touching the progress bar and dragging the touching in a direction away from the progress bar, b) maintaining the touching of the progress bar for a predetermined amount of time, c) touching the progress bar and dragging the touching in a direction along the progress bar, and d) touching the progress bar at first and second points, and wherein the determined at least one of the length of the selected section of the recorded voice data and the determined number of voice keywords corresponds to a) a length of the dragging away from the progress bar, b) the predetermined amount of time of the touching, c) a length of the dragging along the progress bar, and d) a distance between the first and second points on the progress bar.

10. The method of claim 9, further comprising:

changing a shape of the display object to indicate the determined at least one of the length of the selected section of the recorded voice data.

11. The mobile terminal of claim 1, wherein the controller is further configured to display one or more graphic objects showing a point-in-time at which the voice data corresponding to the entire sentence is output.

12. The method of claim 6, further comprising displaying one or more graphic objects showing a point-in-time at which the voice data corresponding to the entire sentence is output.

* * * * *